United States Patent
Jaaskelainen et al.

(10) Patent No.: US 12,292,729 B2
(45) Date of Patent: May 6, 2025

(54) METHOD FOR EQUIPMENT CONTROL

(71) Applicant: Halliburton Energy Services, Inc., Houston, TX (US)

(72) Inventors: Mikko Jaaskelainen, Houston, TX (US); Joshua Lane Camp, Houston, TX (US); Ian Bradford Mitchell, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/443,871

(22) Filed: Feb. 16, 2024

(65) Prior Publication Data
US 2024/0184270 A1 Jun. 6, 2024

Related U.S. Application Data

(60) Continuation of application No. 18/142,348, filed on May 2, 2023, now Pat. No. 11,934,180, which is a
(Continued)

(51) Int. Cl.
*G05B 19/416* (2006.01)
*E21B 43/16* (2006.01)
(Continued)

(52) U.S. Cl.
CPC ............ *G05B 19/416* (2013.01); *E21B 43/16* (2013.01); *E21B 43/26* (2013.01); *E21B 43/2607* (2020.05);
(Continued)

(58) Field of Classification Search
CPC .... G05B 19/41885; G05B 2219/45031; G05B 15/02; G05B 19/416; G05B 2219/43193;
(Continued)

(56) References Cited

U.S. PATENT DOCUMENTS 6,776,235 B1 8/2004 England
6,968,909 B2 * 11/2005 Aldred .................. E21B 49/003
175/45
(Continued)

FOREIGN PATENT DOCUMENTS

WO WO-2016197079 A1 * 12/2016 ......... E21B 41/0021
WO 2018022045 A1 2/2018

OTHER PUBLICATIONS

Filing Receipt, Specification and Drawings for U.S. Appl. No. 17/066,851, entitled "Expert System for Well Treatment," filed Oct. 9, 2020, 96 pages.
(Continued)

*Primary Examiner* — Ronald D Hartman, Jr.
(74) *Attorney, Agent, or Firm* — Conley Rose, P.C.; Rodney B. Carroll

(57) ABSTRACT

A method of controlling a pumping sequence of a fracturing fleet at a wellsite. A managing application executing on a computer in the control van can retrieve the pumping sequence from a local or remote storage computer. The managing application can establish an electronic communication link to receive sensor data from a plurality of fracturing units. The managing application can control the plurality of fracturing units with a stage script with multiple sequential instructions for a pumping stage of a pumping sequence while receiving one or more periodic data sets from the plurality of fracturing units wherein the data sets are indicative of the current state of the pumping stage of the pumping sequence.

20 Claims, 18 Drawing Sheets

Related U.S. Application Data continuation of application No. 17/945,456, filed on Sep. 15, 2022, now Pat. No. 11,675,336, which is a division of application No. 17/066,847, filed on Oct. 9, 2020, now Pat. No. 11,513,500.

(51) Int. Cl.

| | | |
|---|---|---|
| *E21B 43/26* | (2006.01) | |
| *E21B 44/00* | (2006.01) | |
| *E21B 44/02* | (2006.01) | |
| *F04B 17/06* | (2006.01) | |
| *F04B 23/04* | (2006.01) | |
| *F04B 47/02* | (2006.01) | |
| *F04B 49/06* | (2006.01) | |

(52) U.S. Cl.
CPC ............... *E21B 44/00* (2013.01); *E21B 44/02* (2013.01); *E21B 2200/20* (2020.05); *F04B 17/06* (2013.01); *F04B 23/04* (2013.01); *F04B 47/02* (2013.01); *F04B 49/065* (2013.01); *G05B 2219/43193* (2013.01)

(58) Field of Classification Search
CPC .. E21B 43/2607; E21B 2200/20; E21B 43/16; E21B 43/43; E21B 44/00; E21B 44/02
USPC .......................................................... 700/282
See application file for complete search history.

(56) References Cited

U.S. PATENT DOCUMENTS

| | | | |
|---|---|---|---|
| 7,516,793 B2 | 4/2009 | Dykstra | |
| 7,574,325 B2 | 8/2009 | Dykstra | |
| 8,939,205 B2 | 1/2015 | Ersoz | |
| 9,500,076 B2 | 11/2016 | Walters et al. | |
| 11,506,195 B2* | 11/2022 | Orfanoudakis | ......... F04B 49/06 |
| 11,513,500 B2 | 11/2022 | Jaaskelainen et al. | |
| 11,675,336 B2 | 6/2023 | Jaaskelainen et al. | |
| 11,934,180 B2 | 3/2024 | Jaaskelainen et al. | |
| 2008/0149329 A1 | 6/2008 | Ooper et al. | |
| 2008/0209997 A1 | 9/2008 | Bailey et al. | |
| 2013/0298665 A1 | 11/2013 | Minchau | |
| 2014/0000899 A1* | 1/2014 | Nevison | ............... E21B 43/2607 |
| | | | 166/308.1 |
| 2014/0009554 A1 | 1/2014 | Hashimoto | |
| 2014/0095554 A1* | 4/2014 | Thomeer | ................ G06Q 10/06 |
| | | | 707/821 |
| 2014/0262232 A1 | 9/2014 | Dusterhoft et al. | |
| 2014/0352968 A1* | 12/2014 | Pitcher | ................ E21B 43/2607 |
| | | | 166/308.1 |
| 2015/0112601 A1* | 4/2015 | Ozbek | .................... G01V 1/366 |
| | | | 702/14 |
| 2016/0258267 A1* | 9/2016 | Payne | .................... E21B 21/062 |
| 2016/0305223 A1 | 10/2016 | Phillippi et al. | |
| 2017/0075006 A1 | 3/2017 | Dusterhoft et al. | |
| 2017/0247995 A1 | 8/2017 | Crews et al. | |
| 2017/0254186 A1* | 9/2017 | Aidagulov | .......... E21B 43/2607 |
| 2019/0102342 A1* | 4/2019 | Wang | ........................ G06F 7/14 |
| 2019/0330975 A1* | 10/2019 | Martysevich | ......... E21B 43/267 |
| 2020/0386080 A1 | 12/2020 | Xu et al. | |
| 2022/0003229 A1* | 1/2022 | Mu | ........................ F04B 17/06 |
| 2022/0025753 A1* | 1/2022 | Heidari | ................. E21B 49/005 |
| 2022/0112796 A1 | 4/2022 | Jaaskelainen et al. | |
| 2022/0113702 A1 | 4/2022 | Jaaskelainen et al. | |
| 2023/0266747 A1 | 8/2023 | Jaaskelainen et al. | |

OTHER PUBLICATIONS

Office Action dated Apr. 5, 2022 (17 pages), U.S. Appl. No. 17/066,851, filed Oct. 9, 2020.

Office Action dated Sep. 27, 2022 (11 pages), U.S. Appl. No. 17/066,851, filed Oct. 9, 2020.

Office Action dated Feb. 8, 2023 (12 pages), U.S. Appl. No. 17/066,851, filed Oct. 9, 2020.

\* cited by examiner

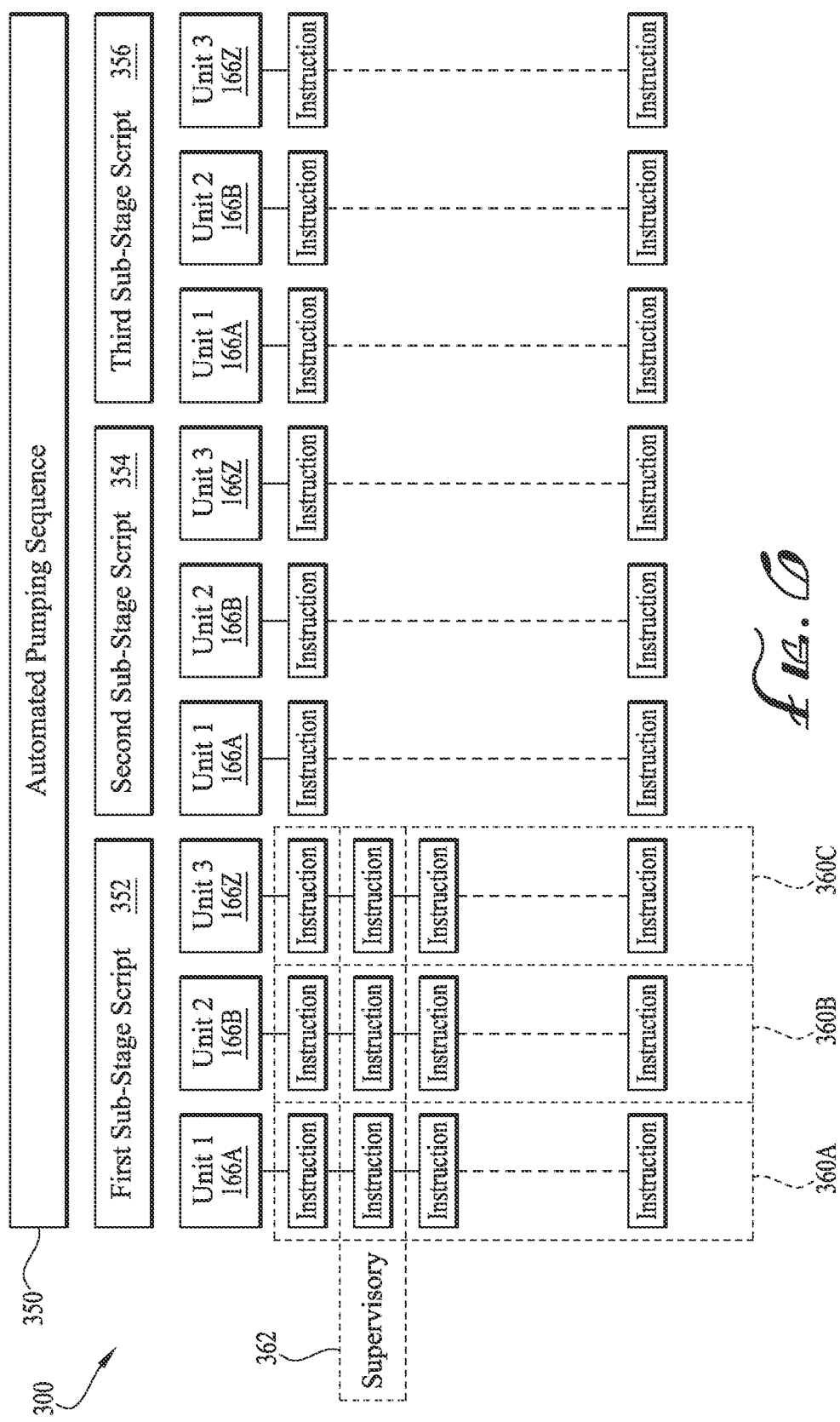

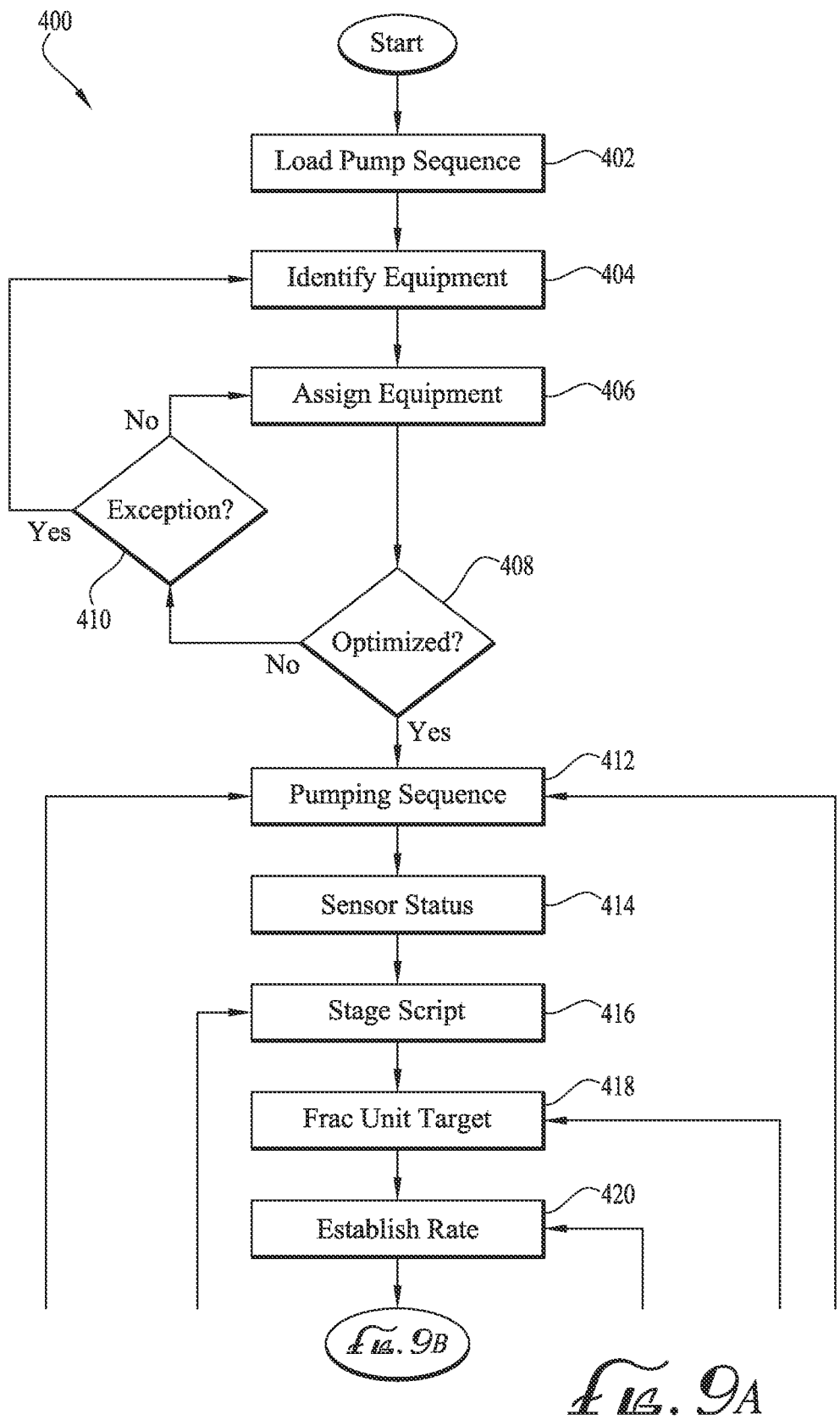

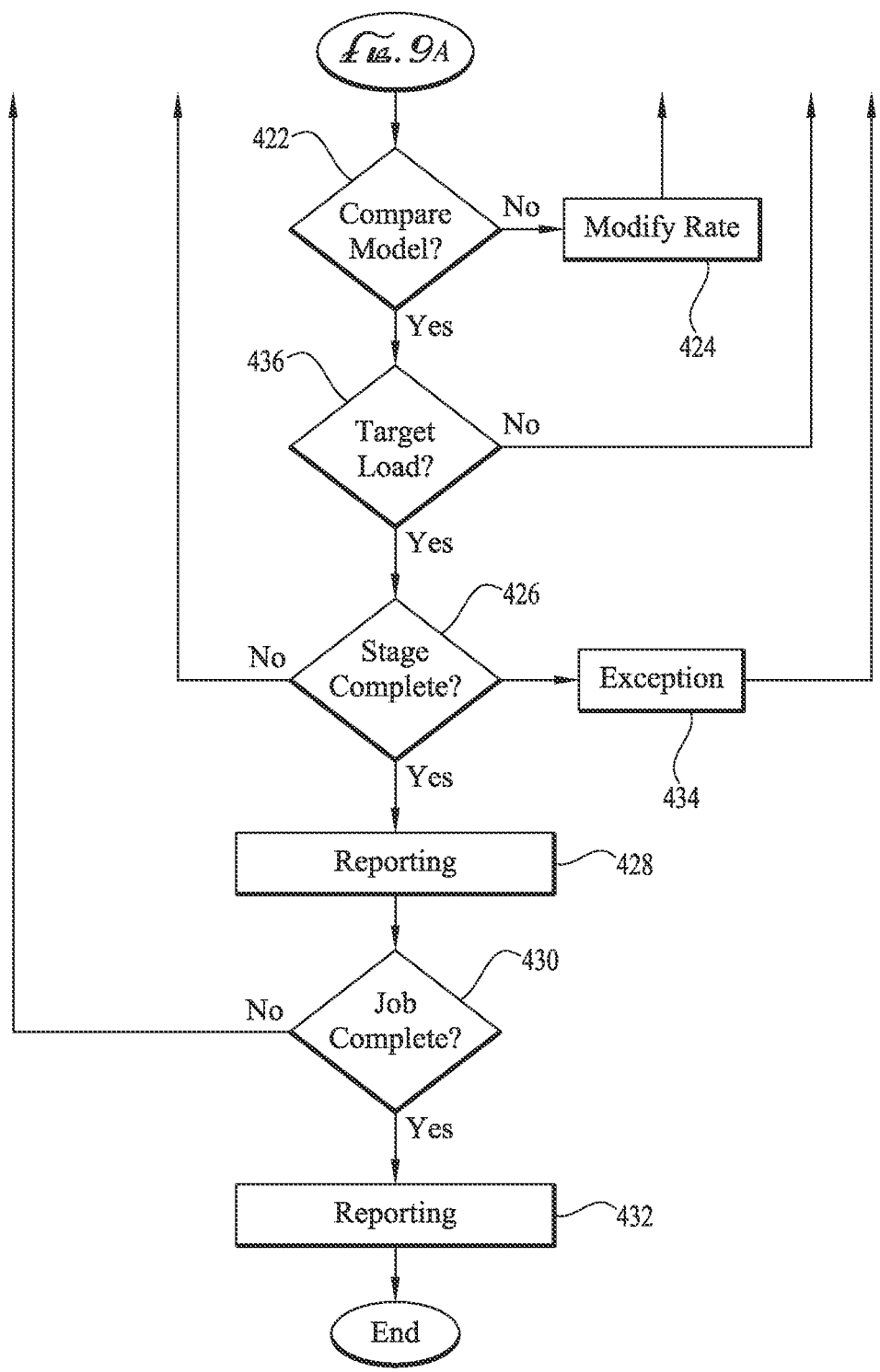

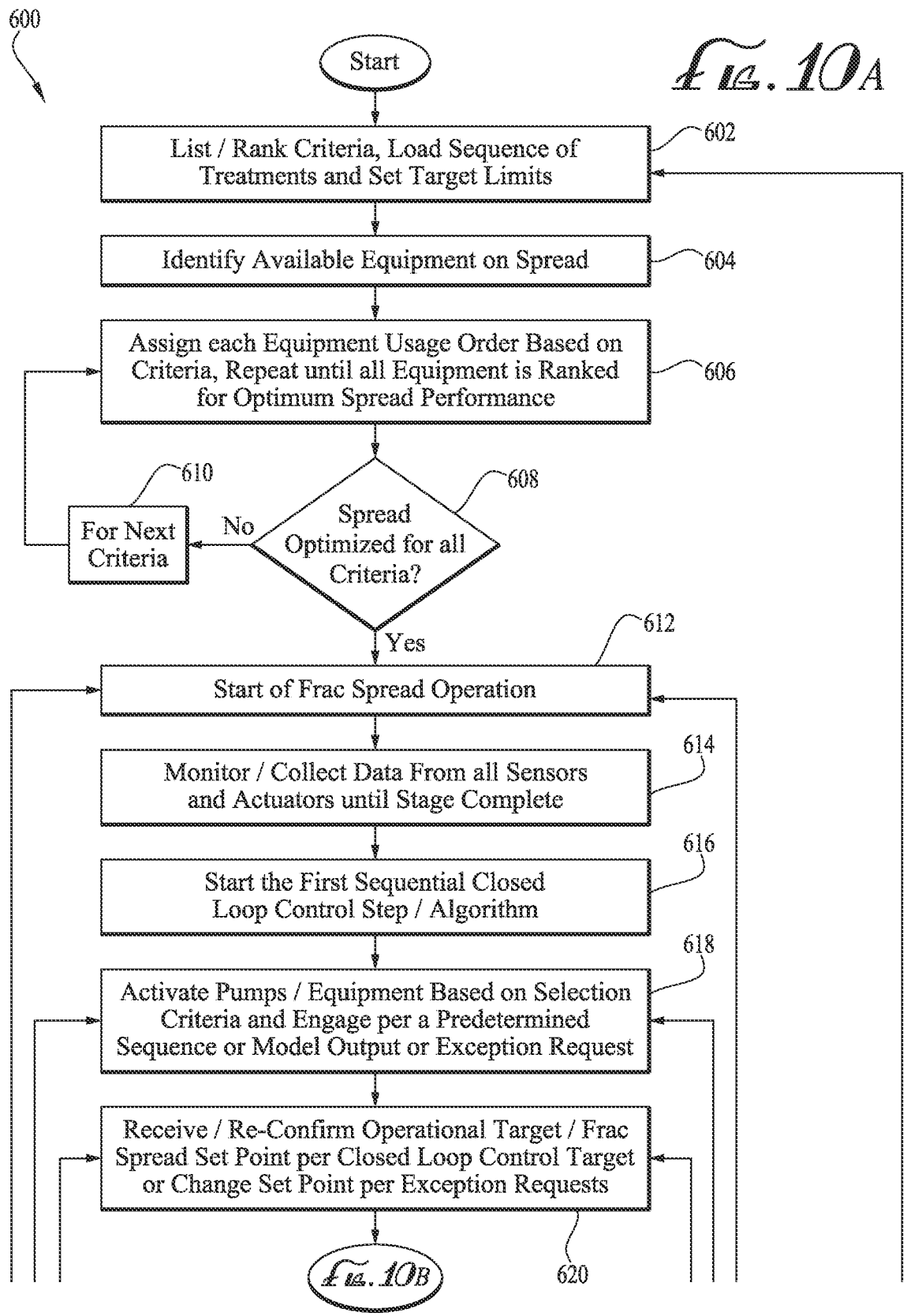

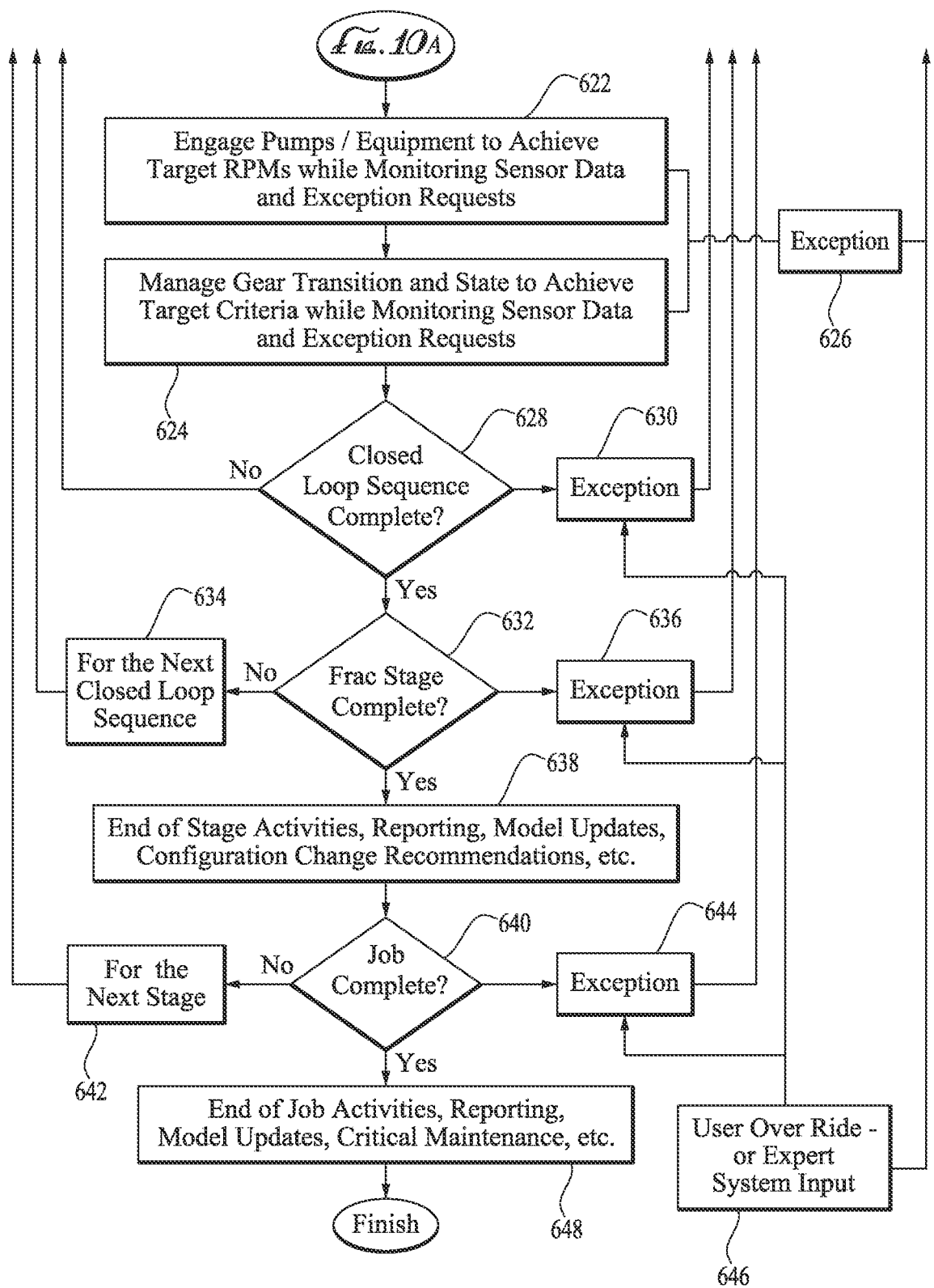

METHOD FOR EQUIPMENT CONTROL

CROSS-REFERENCE TO RELATED APPLICATIONS

This application is a Continuation of and claims priority to U.S. patent application Ser. No. 18/142,348 filed May 2, 2023, which is a Continuation of and claims priority to U.S. patent application Ser. No. 17/945,456 filed Sep. 15, 2022, now U.S. Pat. No. 11,675,336, which is a divisional of and claims priority to U.S. patent application Ser. No. 17/066,847 filed Oct. 9, 2020, now U.S. Pat. No. 11,513,500, both entitled "Method for Equipment Control," each of which are incorporated by reference herein in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Subterranean hydraulic fracturing is conducted to increase or "stimulate" production from a hydrocarbon well. To conduct a fracturing process, high pressure is used to pump special fracturing fluids, including some that contain propping agents ("proppants") down-hole and into a hydrocarbon formation to split or "fracture" the rock formation along veins or planes extending from the well-bore. Once the desired fracture is formed, the fluid flow is reversed and the liquid portion of the fracturing fluid is removed. The proppants are intentionally left behind to stop the fracture from closing onto itself due to the weight and stresses within the formation. The proppants thus literally "prop-apart", or support the fracture to stay open, yet remain highly permeable to hydrocarbon fluid flow since they form a packed bed of particles with interstitial void space connectivity. Sand is one example of a commonly-used proppant. The newly-created-and-propped fracture or fractures can thus serve as new formation drainage area and new flow conduits from the formation to the well, providing for an increased fluid flow rate, and hence increased production of hydrocarbons.

To plan a fracturing fluid pumping process to create a targeted fracture, fracturing models can be used, which predict the propagation of fractures through a formation of given mechanical properties in relation to the pumped volume, pumping rate, and rheologic properties of the fracturing fluid being used. The pumping process can be automated with a pumping sequence utilizing the fracturing model to develop a pumping sequence with the pump rates, fluid volume, and slurry density.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 6 is a logical flow diagram depicting a plurality of sub-stage scripts associated with a pumping sequence for a fracturing stage according to an embodiment of the disclosure.

FIGS. 9A and 9B are logical flow diagrams depicting an operational method to the automated pumping sequence according to an embodiment of the disclosure.

FIGS. 10A and 10B are logical flow diagrams depicting an operational method of an automated pumping sequence according to another embodiment of the disclosure.

DETAILED DESCRIPTION

Figure 1:
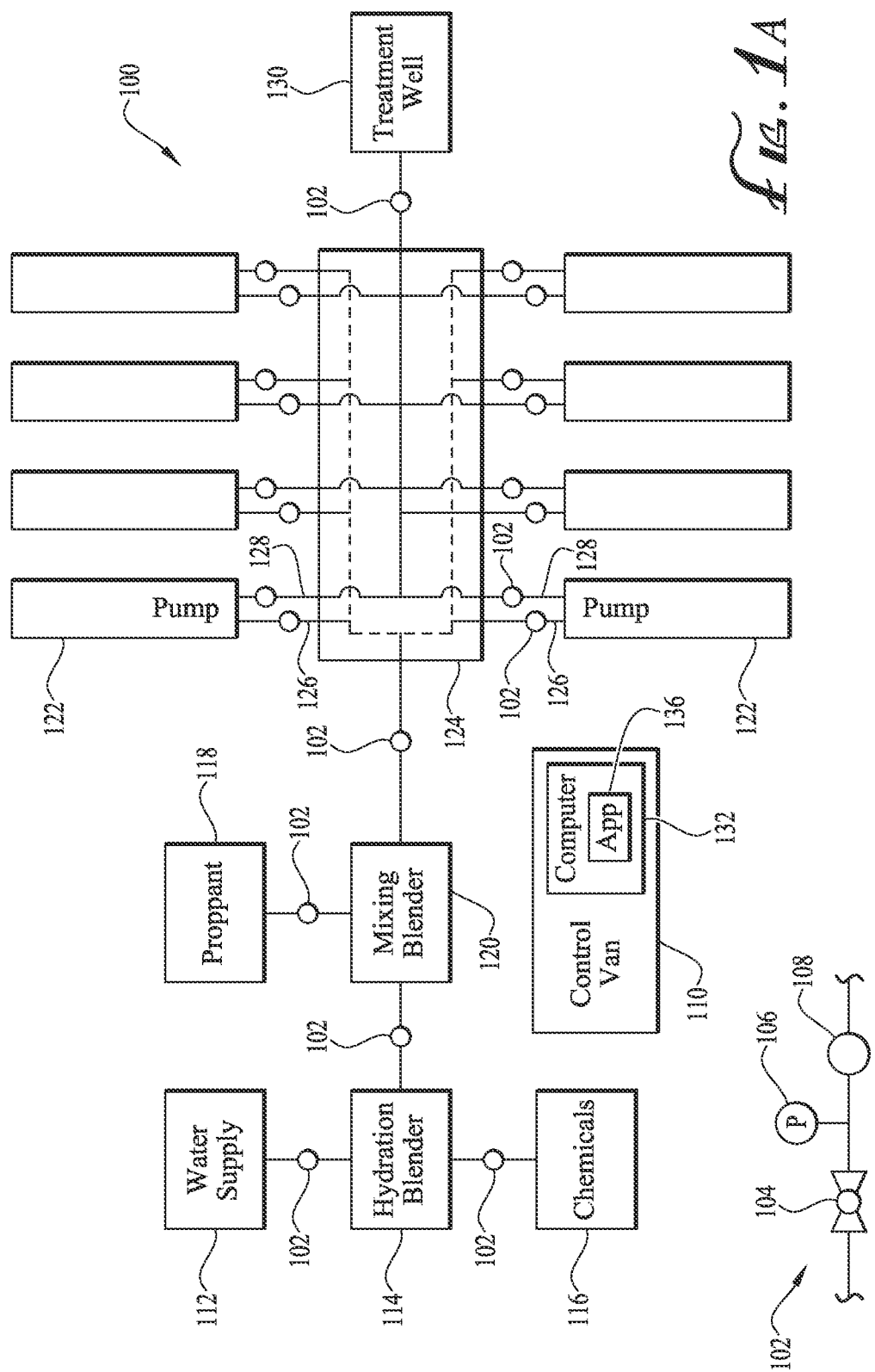
FIG. 1A is a block diagram of a hydraulic fracturing system according to an embodiment of the disclosure.
FIG. 1B is a block diagram of an instrumented package for a hydraulic fracturing system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A modern fracturing fleet typically includes a water supply, a proppant supply, one or more blenders, a plurality of frac pumps, and a fracturing manifold connected to the wellhead. The individual units of the fracturing fleet can be connected to a central control unit called a data van. The control unit can control the individual units of the fracturing fleet to provide proppant slurry at a desired rate to the wellhead. The control unit can manage the pump speeds, chemical intake, and proppant density while pumping fracturing fluids and receiving data relating to the pumping from the individual units.

Service personnel have typically directed the pumping of fracturing fluids from the control unit to follow the pumping sequence of a fracturing model. This direction provided by the service personnel can be manual direction, changes to an automated schedule, or both. For example, the service personnel may monitor an automated pumping sequence during a pumping stage then switch to manual control due to an unplanned event, change the pump rate, or some other pumping process. These changes, also called exceptions, to the automated pumping sequence can be due to a change in the pumping equipment (e.g., line leak), a change in the wellbore environment (e.g., sand out, also referred to a sand screen out or simply a screen out), a requested change from the customer, or other considerations. These exceptions may not be predictable, but the remedial changes required to the pumping sequence can be predictable and/or selected from a predetermined list of available remedial actions.

Exceptions to an automated pumping sequence can create costly delays and, in some cases, a safety hazard. For example, a frac pump may develop a leak around the plunger seals causing a loss of pumping efficiency and a possible environmental cleanup. The frac pump must be isolated and repaired or replaced. The process of isolating a leaking pump during a pumping stage may be difficult for inexperienced service personnel. The lack of experience can cause a delay in the repair, a premature end to the pumping stage, and a possible health, safety, or environmental (HSE) hazard.

In an embodiment, a managing application can control a pumping sequence for a fracturing fleet at a wellsite. The managing application can retrieve a pumping sequence from a storage server. The pumping sequence can include multiple stages corresponding to a pumping operation such as a pump rate test, a ramp up stage, a single zone fracturing, and clean up. The pumping sequence can include a single zone or multiple zones to be fractured. Each pumping stage can be controlled by a stage script written in a scripting computer language such as Python, Java, Perl, Ruby, Tcl, or Smalltalk. The stage script can be a set of instructions for each fracturing unit to follow during a pumping stage. The stage script may link two or more fracturing units together during a pumping stage. For example, the stage script instructions can include the same instructions to two or more pumps during a pumping stage. The fracturing unit can return data (e.g., pressure, temperature, etc.) to the managing application during the pumping stage. The data from the fracturing units is compared to the expected equipment output based on the pumping sequence. When the equipment data doesn't match the predicted equipment output, the managing application can produce an exception notice that returns control to the service personnel. The exception notice may indicate a leak, a pump failure, or an event in the well (e.g., sandout). The service personnel can take remedial action to correct the exception.

In an embodiment, the automated pump sequence can have automated exception handling to clear common exceptions. An exception can be an error from the instruction, an alert generated by the managing application, an alert generated by a second application, or interruption from the user (e.g., service personnel). If an exception is not cleared (e.g., a fault is not corrected), the exception can end the automated pump sequence and return control to the user. The user may not be familiar with the equipment delivered to the wellsite, the overall pumping sequence, or a specific pumping sequence selected for the job. The user may not know the optimal solution when presented with an exception. An automated exception handling routine can provide the solution to clearing the exception with the optimal solution. The automated pump sequence can include automated exception handling to clear the exception so that the automated pump sequence can continue to the next step, next stage, or next treatment. For example, an automated pumping script executed by a managing application may include additional automated exception/remedial scripts that are triggered when an exception occurs. For example, the automated exception handling may idle a leaking pump and close valves to isolate the pump from the manifold. The automated exception handling may attempt one, two, or more automated exception/remedial scripts before issuing an exception notice and returning control to the service personnel.

In an embodiment, the automated pump sequence can assign frac units to perform the pumping sequence based on a set of criteria provided by the user. A variety of pumping equipment can be delivered to a wellsite of various ages, versions of equipment, upgrades, and modifications. For example, a second generation and a third generation of the frac pump with different pump ratings can be delivered to the wellsite. Although the equipment can be functionally identical, some equipment may be better suited for the pumping operation. The service personnel may not be familiar with all the variations of equipment and may spend an extended amount of time determining the right combination of equipment. The automated pumping sequence can provide a solution to the optimization of equipment by selecting the optimal set of equipment for the pumping operation. The managing application can receive an equipment identification from each frac unit and identify the frac unit based on a database of equipment information. The automated pump sequence can optimize an inventory of equipment on site to perform the pumping operation based on criteria provided by the customer such as cost, reservoir and formation objectives, fuel consumption, noise limits, emission limits, and exhaust related targets. The automated pump sequence can select equipment to be held in reserve while creating an inventory for the pumping operation. The equipment can be identified by wireless router identification (e.g., IP address), RFID trackers, GPS trackers, bar codes, or manual entry by the service personnel. The automated pump sequence can select the most efficient combination of equipment for the pumping operation.

Disclosed herein is a method of automating a pumping sequence with a managing application executing on a server at the wellsite. The automated pumping sequence can be written in a scripting language from a fracture modeling application. The managing application issues an exception notice when the equipment data deviates from the expected equipment output. The automated pumping sequence can include automated exception handling.

Described herein is a method of controlling a pumping sequence of a fracturing fleet at a wellsite by a managing application while monitoring equipment data provided by sensors on the fracturing units indicative of a pumping stage of the pumping sequence. Turning now to FIG. 1A, an embodiment of a hydraulic fracturing system 100 that can be utilized to pump hydraulic fracturing fluids into a wellbore, is illustrated. As depicted, a plurality of hydraulic fracturing pumps 122 (also referred to as "frac pump" or high horsepower pumps) is connected in parallel to a fracturing manifold 124 (also referred to as a "missile") to provide fracturing fluids to the treatment well 130 (also referred to as the wellhead). The fracturing fluids are typically a blend of gelled fluid (e.g., water, a gelling agent, optionally a friction reducer, and/or other additives) and proppant. The gelled fluid is created in the hydration blender 114 from the water supply unit 112 and gelling chemicals from the chemical unit 116. The proppant is added at a controlled rate to the gelled fluid in the mixing blender 120 and pumped into the manifold 124 for distribution to the frac pumps 122. For example, the frac pump 122 can receive low pressure fracturing fluids through a feed line 126 and deliver high pressure fracturing fluids though a discharge line 128. Although fracturing fluids typically contain a proppant, a portion of the pumping sequence may include a fracturing fluid without proppant (sometimes referred to as a pad fluid or slick water, for example comprising water and a friction reducer). Although fracturing fluids typically include a gelled fluid, the fracturing fluid may be blended without a gelling chemical. Alternatively, the fracturing fluids can be blended with an acid to produce an acid fracturing fluid, for example, pumped as part of a spearhead or acid stage that clears debris that may be present in the wellbore and/or fractures to help clear the way for fracturing fluid to access the fractures and surrounding formation.

A control van 110 can be communicatively coupled (e.g., via a wired or wireless network) to any of the frac units wherein the term "frac units" may refer to any of the plurality of frac pumps 122, a manifold 124, a mixing blender 120, a proppant storage unit 118, a hydration blender 114, a water supply unit 112, and a chemical unit 116. The managing application 136 executing on a computer (e.g., server) 132 within the control van 110 can establish unit level control over the frac units communicated via the network. Unit level control can include sending instructions to the frac units and/or receiving equipment data from the frac units. For example, the managing application 136 within the control van 110 can establish a pump rate of 25 bpm with the plurality of frac pumps 122 while receiving pressure and rate of pump crank revolutions from sensors on the frac pumps 122.

Although the managing application 136 is described as executing on a computer 132, it is understood that the computer 132 can be a computer system or any form of a computer system such as a server, a workstation, a desktop computer, a laptop computer, a tablet computer, a smartphone, or any other type of computing device. The computer 132 (e.g., computer system) can include one or more processors, memory, input devices, and output devices, as described in more detail further hereinafter. Although the control van 110 is described as having the managing application 136 executing on a computer 132, it is understood that the control van 110 can have 2, 3, 4, or any number of computers 132 (e.g., computer systems) with 2, 3, 4, or any number of managing applications 136 executing on the computers 132.

In some embodiments, the hydraulic fracturing system 100 can include an instrumented package 102 coupled to one or more frac units, for example, to isolate one or more frac units upon receipt of a computerized command. The instrumented package 102 can be communicatively coupled to the managing application 136 within the control van 110. Turning to FIG. 1B, an instrumented package 102, is illustrated. The instrumented package 102 can include one or more isolation valves 104 and sensors that measure data at a periodic rate such as milliseconds, seconds, minutes, hours, days, and months. The isolation valve 104 is typically a plug valve that can be manual, hydraulic, electrical, or pneumatic operated. Although one isolation valve 104 is shown, two or more isolation valves 104 may be used. The instrumented package 102 can include sensors to measure temperature, pressure, flow rate, density, viscosity, vibration, strain, accelerometers, exhaust, acoustic, position, and identity. For example, a pressure transducer 106 can be configured to measure the pressure in pounds per square inch (psi). A flow rate sensor 108 can be a turbine, differential, ultrasonic, Coriolis, or any other type of flow meter configured to measure in barrels per minute (bpm). A weight sensor can measure proppant by the weight of material added. For example, the rate that proppant is added to the fracturing fluids can be measured by pounds per gallon (ppg). The periodic data can be communicated to the control van 110. In some embodiments, the managing application 136 within the control van 110 can remotely operate one or more isolation valves 104 in the instrumented package 102 to the open or closed position. In an aspect, the isolation valve 104 is has a fail-safe in a closed position, such that the valve closes in the event of a loss of power or communication from control van 110.

Figure 2:
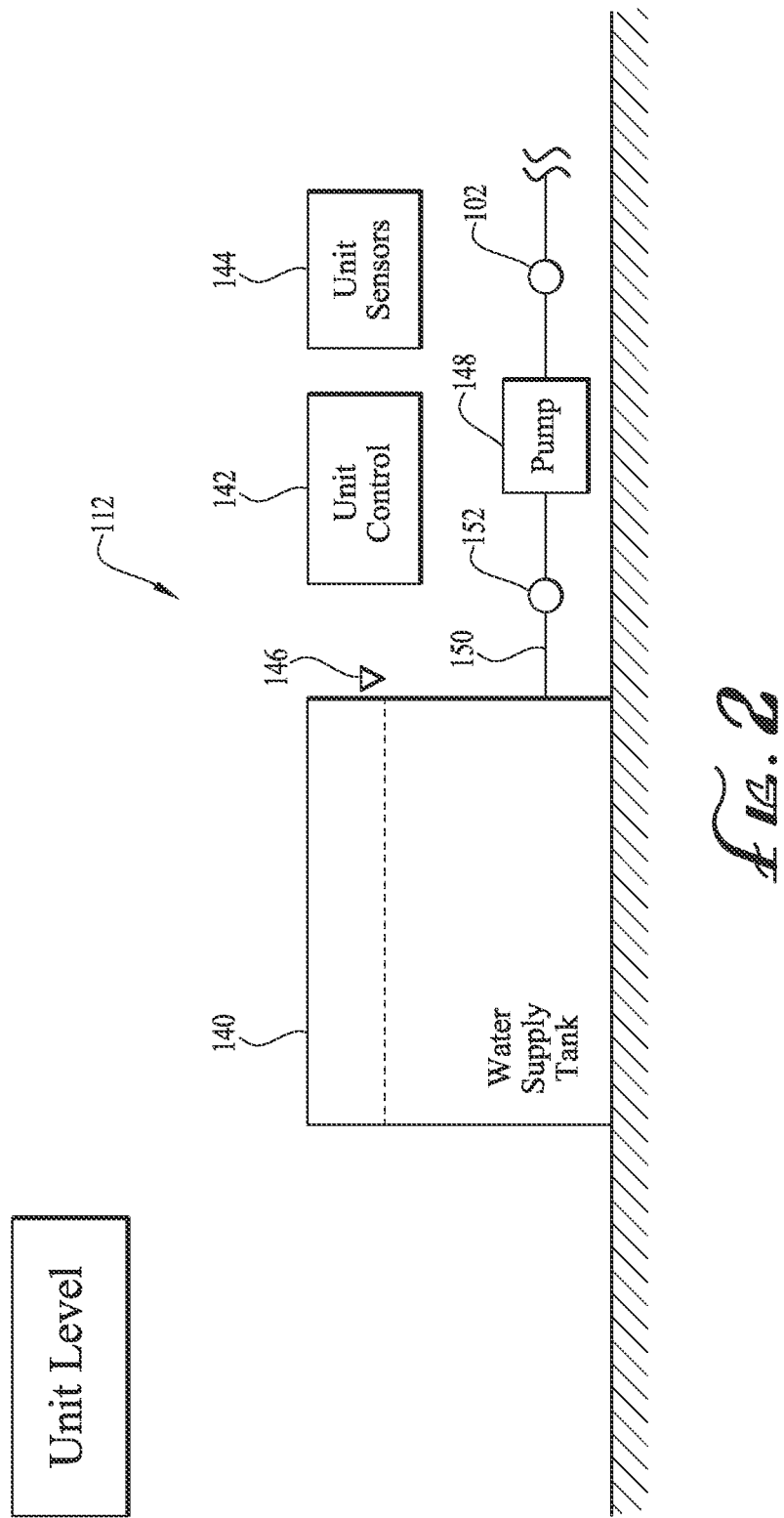
FIG. 2 is a block diagram of a water supply unit for a hydraulic fracturing system according to an embodiment of the disclosure.

Turning now to FIG. 2, an example of unit level control of the frac units is illustrated. As an example, the water supply unit 112 includes a water supply tank 140, a unit control module 142, a unit sensor module 144, a water supply pump 148, and a pipeline 150. The water supply unit 112 can further comprise an instrumented package 102, for example, in pipeline 150. The unit control module 142 (e.g., microprocessor controller) is in communication with and can operate the water supply pump 148, an isolation valve 152, and the instrumented package 102. The unit sensors module 144 is in communication with and can receive periodic sensor data from various sensors including temperature, pressure, flow rate, density, viscosity, chemical, vibration, strain, accelerometers, exhaust, acoustic, fluid level, equipment identity, and any other sensors typically used in the oilfield. The sensors can measure data at a periodic rate such as milliseconds, seconds, minutes, hours, days, and months. For example, the unit sensor module 144 can receive periodic data from a water level sensor 146. The managing application 136 within the control van 110 can establish unit level control of the water supply unit 112 by communicatively connecting to the unit control module 142 and the unit sensor module 144. The managing application 136 within the control van 110 can control the isolation valve 152, water supply pump 148, and/or the instrumented package 102 via the unit control module 142. The control van 110 can monitor the equipment data, such as water level and flow rate, via unit sensor module 144. Although the water supply unit 112 is shown, all of the frac units can have a unit control module 142 and unit sensor module 144 such as the hydration blender 114, the chemical unit 116, the proppant storage unit 118, the mixing blender 120, the manifold 124, and the plurality of frac pumps 122. The managing application 136 within the control van 110 can direct the frac fleet, illustrated in FIG. 1, to prepare a fracturing fluid having a desired composition and pump the frac fluid at a desired pressure and flow rate.

In an aspect, one or more frac units of the frac fleet can be connected to the treatment well 130 at a production tree of the treatment well 130. For example, a wellhead isolation tool can connect the manifold 124 to the production tree. The wellhead isolation tool and production tree can include a unit sensor module (e.g., 144) with one or more surface sensors, downhole sensors, and associated monitoring equipment. The sensors on surface frac units can measure the equipment operating conditions including temperature, pressure, flow rate, density, viscosity, chemical, vibration, strain, accelerometers, exhaust, acoustic, fluid level, and equipment identity. Sensors on the wellhead isolation tool and production tree can measure the environment inside the treatment well including temperature, pressure, flow rate, density, viscosity, chemical, vibration, strain, accelerometers, and acoustic. In an aspect, one or more frac units of the frac fleet can connect to the treatment well 130 with a wellhead isolation tool, a wellhead, a production tree, a drilling tree, or a blow out preventer.

In an aspect, one or more frac units of the frac fleet can be downhole tools communicatively connected to the control van 110. For example, a frac sleeve with downhole sensors can be communicatively connected to the production tree and wellhead isolation equipment. In another aspect, a hydrojetting, perforating gun, or other perforating tool deployed downhole via a wireline or coiled tubing unit as part of a perf and frac operation, and one or more sensors may be associated with the surface and/or subsurface equipment associated with such an operation. The downhole sensors can include wellbore cables, electronic sensors, fiber optic sensors, and other types of downhole sensors that measure the wellbore environment. The wellbore sensors can be located within the wellbore at the surface, extend into a portion of the wellbore, located proximate to a formation, or located at one or more locations within the wellbore. The downhole sensors include temperature, pressure, flow rate, density, viscosity, vibration, strain, accelerometers, and acoustic. For example, the downhole sensors may be fiber optic type cable commonly referred to as distributed acoustic sensing (DAS) placed within the wellbore proximate to one or more perforation clusters. The downhole sensors can connect to a unit sensor module communicatively connected to the control van 110. The downhole tools can connect to a unit control module communicatively connected to the control van 110.

Figure 3:
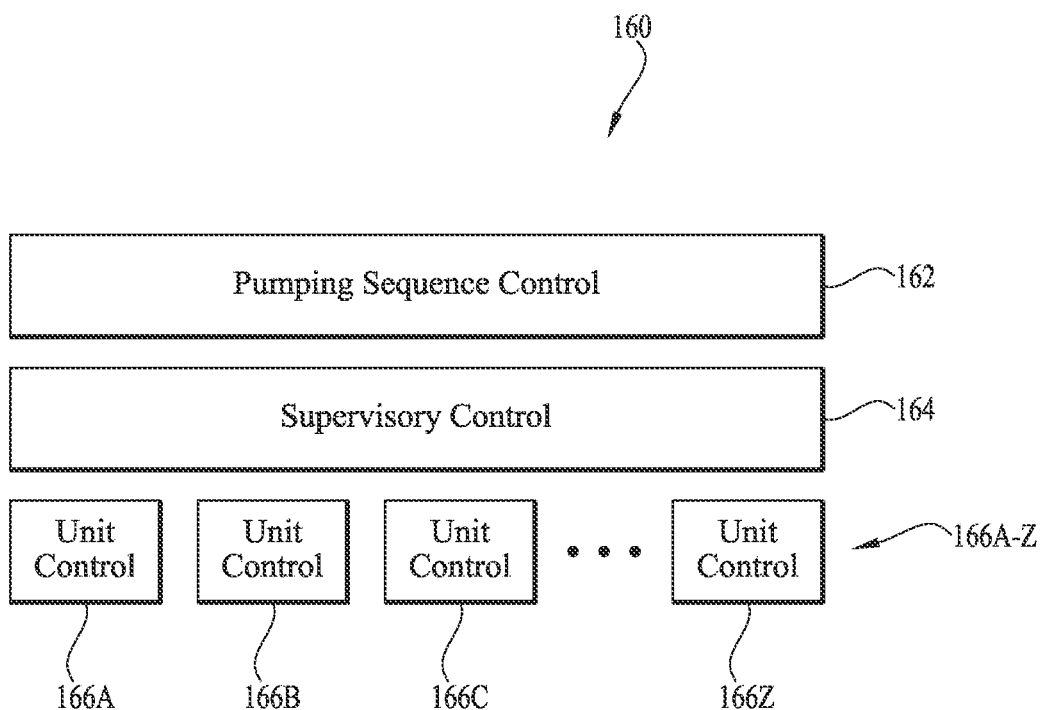
FIG. 3 is a block diagram of a hierarchy of a method of automated fleet control according to an embodiment of the disclosure.

The method used by the managing application 136 to pump the frac fluid at a desired pressure and flow rate can include an automated fleet control method following a pumping sequence. Turning now to FIG. 3, the hierarchy of a method of automated fleet control 160 is illustrated. The automated fleet control hierarchy 160 includes pumping sequence control 162, supervisory control 164, and a plurality of unit level control 166A-Z. The pumping sequence control 162 may be the managing application 136 executing on the computer 132. An operator located in the control van 110 may install a pumping sequence for a given fracturing service into the pumping sequence control 162 executing on the computer 132. The pumping sequence may be a series of steps, also called stages, with one or more defined frac fluid pump rates (e.g., a ramp up flow rate, a steady state flow rate, and a ramp down flow rate for each stage) for one or more frac fluids used in a stage (e.g., acid fluids, pad fluids, slick water, proppant laden fluids, water, etc.). Stages of a pumping sequence can correspond to various locations downhole, for example, fracturing a plurality of stages starting at the toe of a horizontal or lateral leg of a well and proceeding stage-wise to the heel of the lateral leg adjacent to a vertical portion of the wellbore. The pumping sequence control 162 (e.g., managing application 136) can direct the supervisory control 164 to follow the pumping sequence. The supervisory control 164 can direct the unit control 116A-Z to communicate the commands and instructions to the unit control module of each frac unit, such as unit control module 142 of the water supply unit 112. The supervisory control 164 may direct two or more frac units to work in concert with the same instructions given to each unit. For example, the supervisory control 164 can instruct the unit control 116A-Z to direct a plurality of frac pumps 122 to operate at the same pump rate. The supervisory control 164 can direct one or more frac units to operate within the same limits. For example, the supervisory control 164 can instruct the one or more unit controls 116A-Z to direct the mixing blender 120 to supply frac fluid to the plurality of frac pumps 122 at the same flow rate as the frac pumps 122 are pumping.

Figure 4:
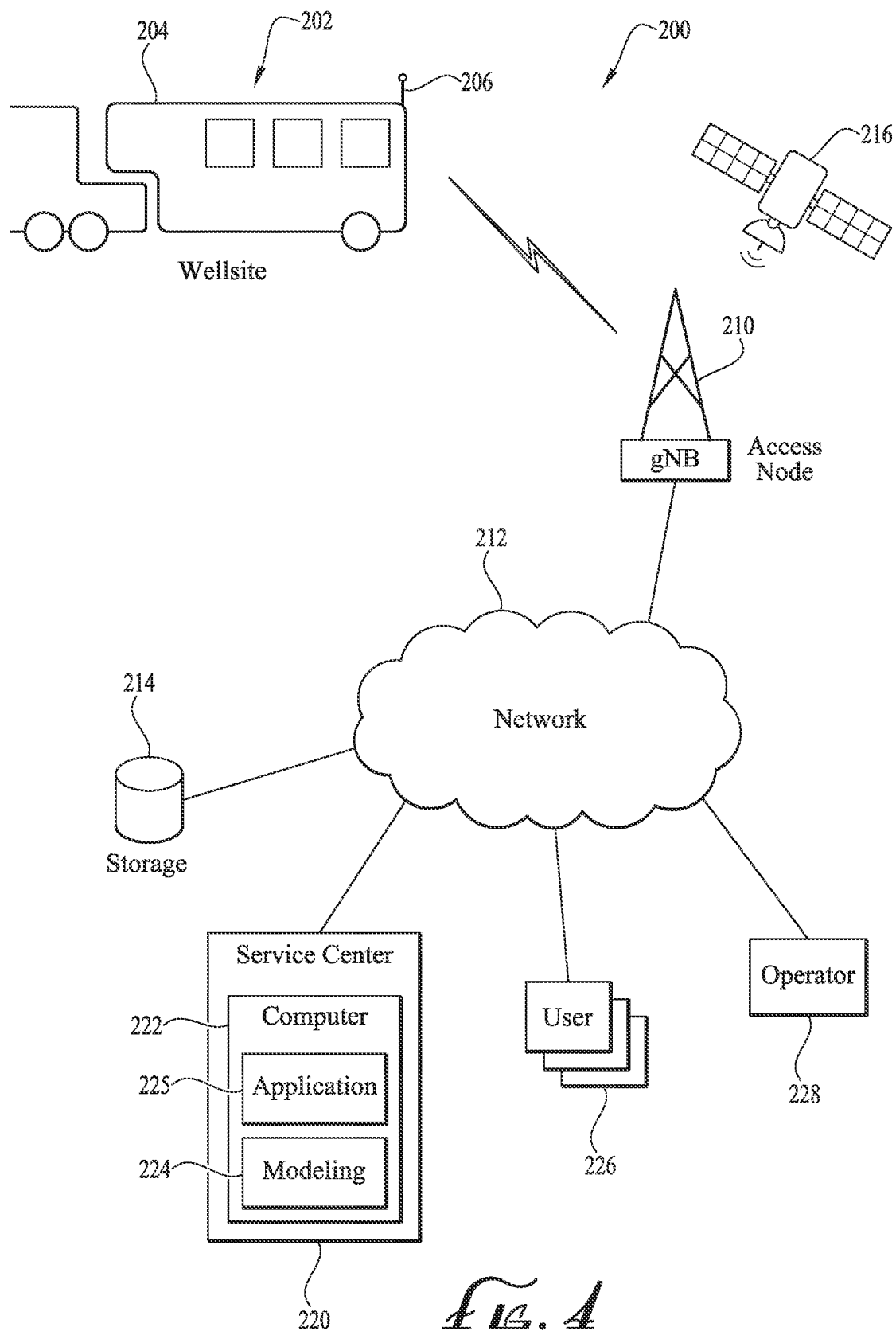
FIG. 4 is a schematic diagram of a communication system according to an embodiment of the disclosure.

Data can be transmitted and received by various wired or wireless means between a service center and the control van 110 at a remote wellsite location for further processing. Turning now to FIG. 4, a data communication system 200 is described. The data communication system 200 comprises a wellsite 202 (where the fracturing spread of FIG. 1A can be located), an access node 210 (e.g., cellular site), a network 212, a storage computer 214, a central computer 222 (e.g., server), a plurality of user devices 226, and one or more customer devices 228. A wellsite 202 can include a control van 204 as part of a frac fleet (e.g., control van 110 of FIG. 1A) pumping a frac fluid into the wellhead (e.g., treatment well 130 in FIG. 1A). The control van 204 can include a communication device 206 (e.g., transceiver) that can transmit and receive via any suitable communication means (wired or wireless), for example, wirelessly connect to an access node 210 to retrieve data (e.g., pumping sequence) from a storage computer 214. The storage computer 214 may also be referred to as a data server, data storage server, or remote server. Wireless communication can include various types of radio communication, including cellular, satellite 216, or any other form of long range radio communication. The communication device 206 can transmit data via wired connection for a portion or the entire way to the storage computer 214. The communication device 206 may communicate over a combination of wireless and wired communication. For example, communication device 206 may wirelessly connect to access node 210 that is communicatively connected to a network 212. The network 212 can be one or more public networks, one or more private networks, or a combination thereof. A portion of the Internet can be included in the network 212. The storage computer 214 can be communicatively connected to the network 212. The service center 220 can have one or more central computers 222 (e.g., servers) communicatively connected to the network 212.

A pumping sequence associated with a wellbore fracturing job can be determined from fracture modeling performed by a fracture modeling application 224 executing on a central computer 222, for example in accordance with the disclosure of co-pending U.S. application Ser. No. 17/066,851, entitled "Expert System for Well Treatment" and incorporated herein by reference in its entirety. A user device 226 can receive a customer request for a fracturing job (e.g., comprising a pump schedule) with various customer inputs from a customer device 228. The customer inputs may include formation properties, a number of zones, well completion information, well logs, a well survey, or combinations thereof. The fracture modeling software can predict the propagation of fractures within a given formation penetrated by a wellbore based on the mechanical properties of the formation and rheologic properties of the fracturing fluid. These formation mechanical properties may be based on rock cores, survey data, or determined from previous fracturing operation performed in the same field. The fracture modeling application 224 executing on a central computer 222 can produce a pumping sequence based on the desired fracture propagation. In an aspect, the fracture modeling application 224 includes fracture propagation prediction software such as SmartFleet, available from Halliburton, which can include pumping sequence creation. The fracture modeling application 224 can send the pumping sequence to the storage computer 214 via network 212. Likewise, the fracture modeling application 224 can send the pumping sequence to the control van 204 via the network 212, the access node 210, and the communication device 206.

An automated pumping sequence can be created from the pumping sequence modeled by the fracture modeling application 224. The automated pumping sequence can be created by the fracture modeling application 224 or a second application 225 (e.g., managing application) and saved to storage computer 214 and/or transmitted to the control van 204 at the wellsite 202. For example, a user device 226 can be used to direct the managing application 225 to create an automated pumping sequence from the pumping sequence. The managing application 225 can retrieve the pumping sequence from the storage computer 214 via the network 212. The managing application 225 can retrieve the pumping sequence from the control van 204 via the network 212 and access node 210. The managing application 225 can also retrieve the pumping sequence from the computer 222 within the service center 220. The automated pumping sequence can be created from the pumping sequence and saved to storage computer 214 or transmitted to the control van 204 at the wellsite 202.

Although the fracture modeling application 224 is described as executing on a central computer 222, it is understood that the central computer 222 can be a computer system or any form of a computer system such as a server, a workstation, a desktop computer, a laptop computer, a tablet computer, a smartphone, or any other type of computing device. The central computer 222 (e.g., computer system) can include one or more processors, memory, input devices, and output devices, as described in more detail further hereinafter. Although the service center 220 is described as having the fracture modeling application 224 executing on a central computer 222, it is understood that the service center 220 can have 2, 3, 4, or any number of computers 222 (e.g., computer systems) with 2, 3, 4, or any number of fracture modeling applications 224 or second applications 225 (e.g., managing application) executing on the central computers 222.

In an aspect, the network 212 includes a 5G core network with virtual servers in a cloud computing environment. One or more servers of the type disclosed herein, for example, storage computer 214 and central computer 222, can be provided by a virtual network function (VNF) executing within the 5G core network. In an aspect, the access node 210 can be referred to as a gigabit Node B (gNB) of 5G technology generation. In some contexts, the access node 210 can be referred to as a cell site or cell tower, as will be discussed further hereinafter. The control van 204 on the wellsite 202 can be communicatively coupled to the network 212, which includes the 5G network via the access node 210 (e.g., gigabit Node B) and thus can be communicatively coupled to one or more VNFs with virtual servers as will be more fully described hereinafter.

Figure 5A:
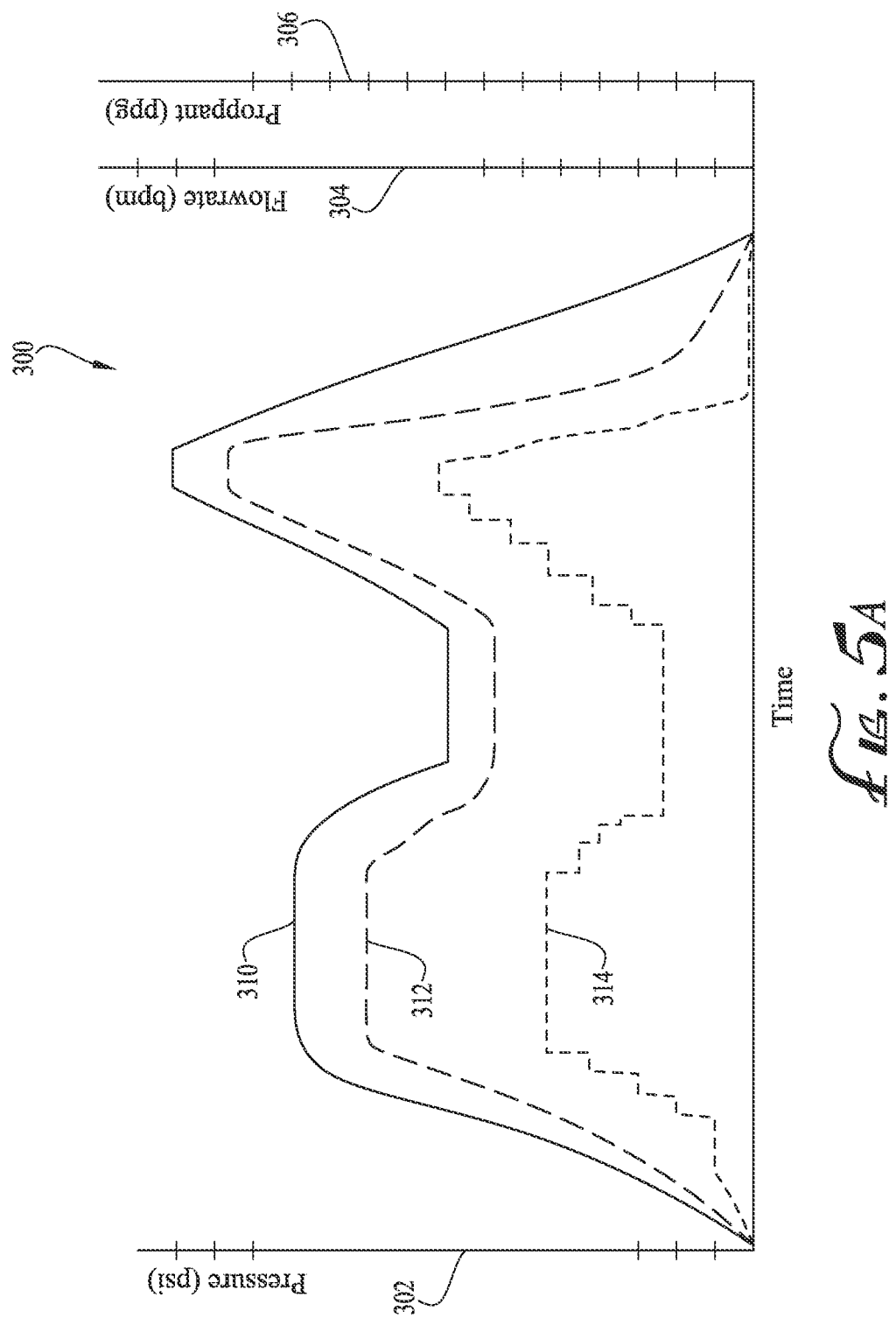
FIGS. 5A and 5B are illustrations of a pumping sequence according to an embodiment of the disclosure.

A pumping sequence may be associated with a pumping stage, and each pumping stage may be separated into a series of pumping sub-stages (e.g., scripts) as a function of time having one or more transitions between each pumping sub-stage. Turning now to FIG. 5A, a pumping sequence, which may also be referred to as a pumping schedule or a plurality of successive time-dependent pumping intervals, 300 is illustrated. The pumping sequence is illustrated as a graph of pressure, flow rate, and proppant density as a function of time. The chart includes a pressure axis 302 with units of pounds per square inch (psi), flowrate axis 304 with units of barrels per minute (bpm), a proppant axis with units of pounds per gallon (ppg), and a horizontal axis of time with units of seconds, minutes, or hours. The graph of the pumping sequence 300 includes a pressure plot line 310, flowrate plot line 312, and proppant plot line 314 for a single zone hydraulic fracturing treatment. A fracturing job can include treatment for 2, 3, 4, 5, 10, 20, 40, 80, or any number of zones, and a corresponding number of pumping sequences 300 of the type illustrated in FIG. 6A can be used. Although the pumping sequence 300 illustrated in FIG. 6A shows a treatment of a single fracturing zone within the wellbore (which may also be referred to as a single stage), the pumping sequence 300 can include other pumping operations including pressure testing of individual pumps, removing air from pumping equipment and pressure lines, pressure testing the pumping system, a rate controlled zonal treatment, a chemical treatment without proppant, releasing a diverter treatment, and treatment pumping with pressure limits. The pumping sequence 300 can include one or more pumping operations within each stage or zone treated.

Figure 5B:
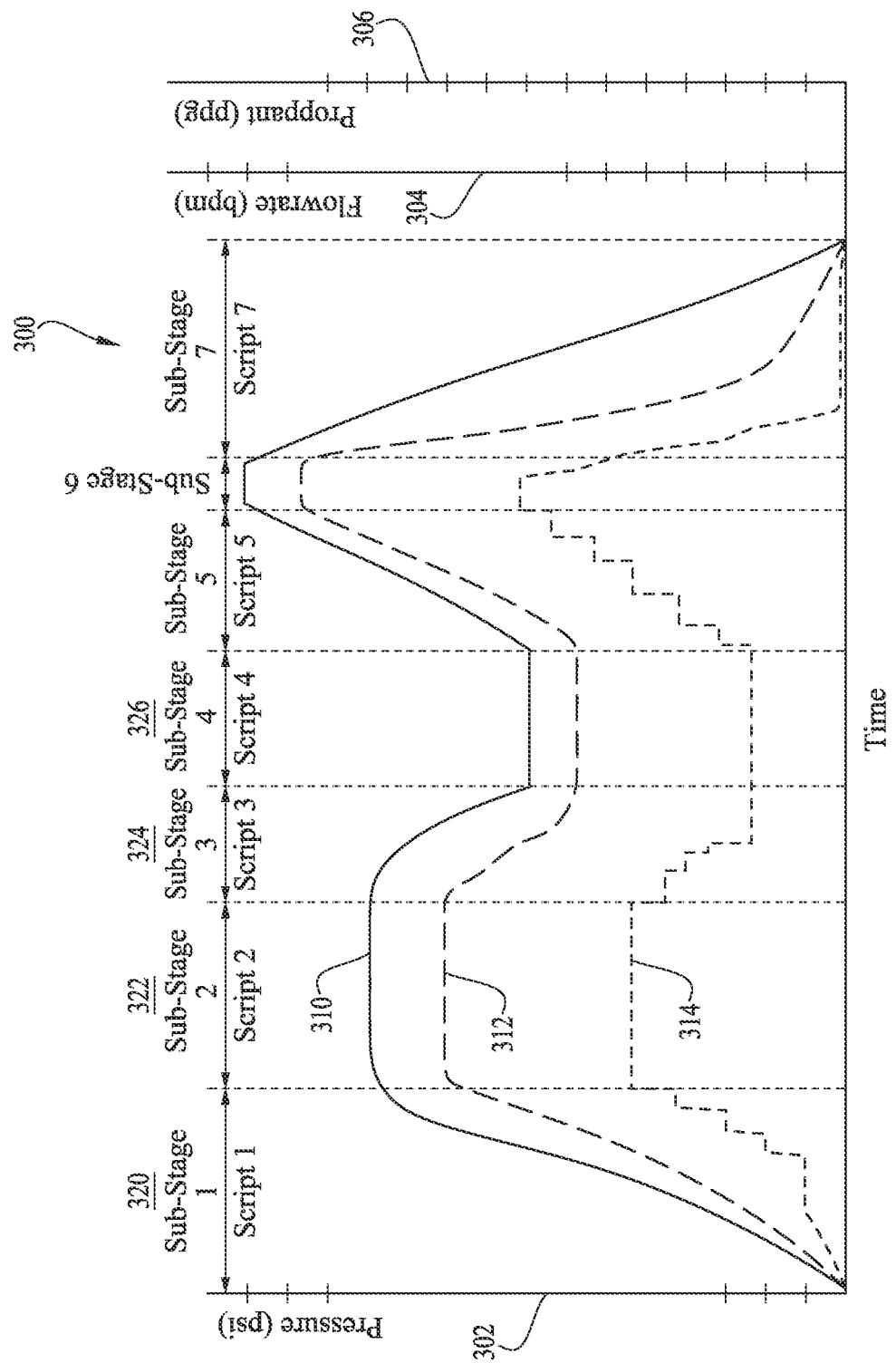

Turning now to FIG. 5B, the pumping sequence 300 can be broken up into pumping sub-stages comprised of steady sub-stages and transition sub-stages. The first sub-stage 320 is a transition sub-stage in the pumping sequence 300, where the pressure plot line 310, flowrate plot line 312, and proppant plot line 314 are increasing in value. The transition sub-stages can be a smooth plotline (e.g., 310 & 312), indicating an approximate steady increase in pressure and flowrate or a stepped increase (e.g., 314) indicating an incremental increase in proppant density. The second sub-stage 322 can be a steady stage where the pumping rate remains steady. The pressure plot line 310, flowrate plot line 312, and proppant plot line 314 are steady in value. The third sub-stage 324 can be a transition sub-stage where the plotlines are decreasing in value to another steady state stage. The fourth sub-stage 326 can be a steady sub-stage where the pumping rate remains steady. Although seven pumping sub-stages are shown, the pumping sequence 300 can include 10, 20, 30, 40, 50, or any number of pumping sub-stages without deviating from this disclosure.

The pumping sequence 300 can be written (e.g., coded as software) as an automated pumping sequence 350 comprising a set of instructions in a scripting language for execution by managing application 136. Turning now to FIG. 6 with reference to FIG. 3, the automated pumping sequence 350 can include an automated script for each pump stage with multiple instructions (e.g., commands) for each frac unit. The automated script may comprise multiple instructions written in a high level programming language or scripting languages such as Python, Java, Perl, Ruby, Tcl, or Smalltalk. The term instruction is defined as a command, multiple commands, and a line of script (e.g., high level programming language) that can contain one or more instructions. This type of high level programming language may include instructions that control the hardware function (e.g., open, close, on, off, etc.), firmware, and software.

A sub-stage script may be written for each pumping sub-stage. For example, the first sub-stage script 352 in FIG. 6 may be an automatic pumping script for the first sub-stage 320 in FIG. 5B. The second sub-stage script 354 in FIG. 6 may be the automatic script written for the second sub-stage 322 in FIG. 5B. The third sub-stage script 356 may be the automatic script written for the third sub-stage 324 in FIG. 5B. Within each sub-stage script (e.g., first sub-stage script 352), a unit script 360 A-Z may be written for the unit level control 166A-Z of each frac unit. For example, with reference to FIG. 2, the automated unit script 360A can instruct the unit control module 142 of the water supply unit 112 within the first sub-stage script 352. The supervisory control 164 can link the instructions to two or more unit scripts 360A-Z with a supervisory link 362. Although three sub-stage scripts and three pumping sub-stages are described, a sub-stage script can be created for 3, 5, 10, 20, 50, 100, or any number of sub-stages without deviating from the disclosure.

The first sub-stage script 352 can be written to idle the frac units, pressure test the frac units, to prime the equipment (e.g., add water to the equipment linking pipelines), increase the pump rate, increase a fluid density, add a chemical to fluid flow, establish a desired pump rate, decrease the pump rate, decrease a fluid density, drop a mechanical device into the well, cease the pumping operation or any combination thereof. The first sub-stage script 352 can also be written to establish the frac units available on the wellsite based on a unique identifier associated with each unit (e.g., an identification number encoded within an RFID tag, a bar code, etc.).

Figure 7:
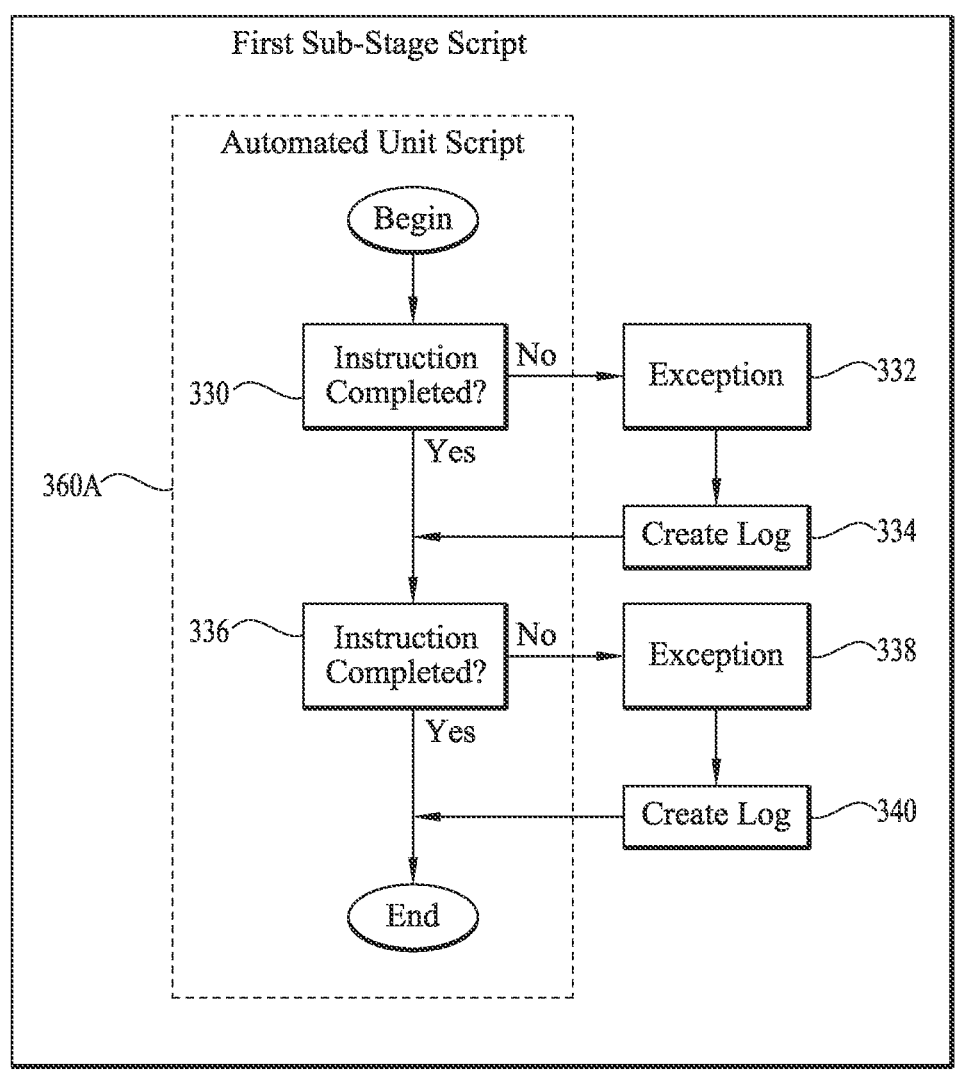
FIG. 7 is a logical flow diagram depicting an automated unit script for the first sub-stage script according to an embodiment of the disclosure.

Turning now to FIG. 7, an automated unit script for the first sub-stage script is illustrated in a logical flow diagram. The automated unit script 360A can comprise hundreds of lines of script (e.g., high level programming language) with multiple instructions on each line corresponding to multiple operating instructions to a given process unit such as water supply unit 112 of FIG. 2. The automated unit script 360A may include an error report, and a logged status report after each line has been completed. The logged status report may report a line of script that has completed, the status of the script, and an exception message. The exception messages, also called error messages, error flags, flags, alerts, or alarms, may be of different priority levels such as information, warning, error, and critical exception. Any of the exception messages may stop the automatic execution of an instruction within the unit script (e.g., 360A) and return control to the service personnel. The managing application 136 alerts the service personnel (e.g., an operator in control van 110) when the automated unit script 360A reports an exception and returns control to the service personnel. As shown in FIG. 7, the automated unit script 360A can begin with executing an instruction at block 330. Although two instructions are shown (e.g., corresponding to blocks 330 and 336), the automated unit script 360 may include a plurality of command lines (e.g., tens or hundreds of lines of script), and the instruction at block 330 may be a single exemplary line of script. For example, the automated unit script 360A may execute the instruction at block 330 on the unit control module 142 of the water supply unit 112 to open the isolation valve 152. If the instruction at block 330 completes without an error, then automated unit script 360A moves to instruction at block 336. However, if the instruction at block 330 returns an error (e.g., the valve is non-response, the valve failed to open, etc.), the managing application 136 stops to report the exception at block 332 and returns control to the service personnel. The service personnel can clear the exception at block 332 (e.g., manually open the valve 152) and restart the automated unit script 360A. The first sub-stage script 352 can create a log of the exception (e.g., the failure of valve 152 to open) and the actions the service personnel used to clear the exception at block 334 (e.g., manually opening the valve 152). The service personnel can restart the automated unit script 360A and managing application 136 can step to the next instruction at block 336. The automated unit script 360A may complete the next instruction at block 336 (e.g., turn on pump 148) or generate an exception at block 338 (e.g., the pump is non-responsive, the pump failed to start). The exception, such as block 332 and block 338, may be generated for each fault encountered by the automated unit script 360A. A diagnostic log at block 340 may be created by the managing application 136 comprised of the commands or actions used to clear the exception at block 338.

Figure 8:
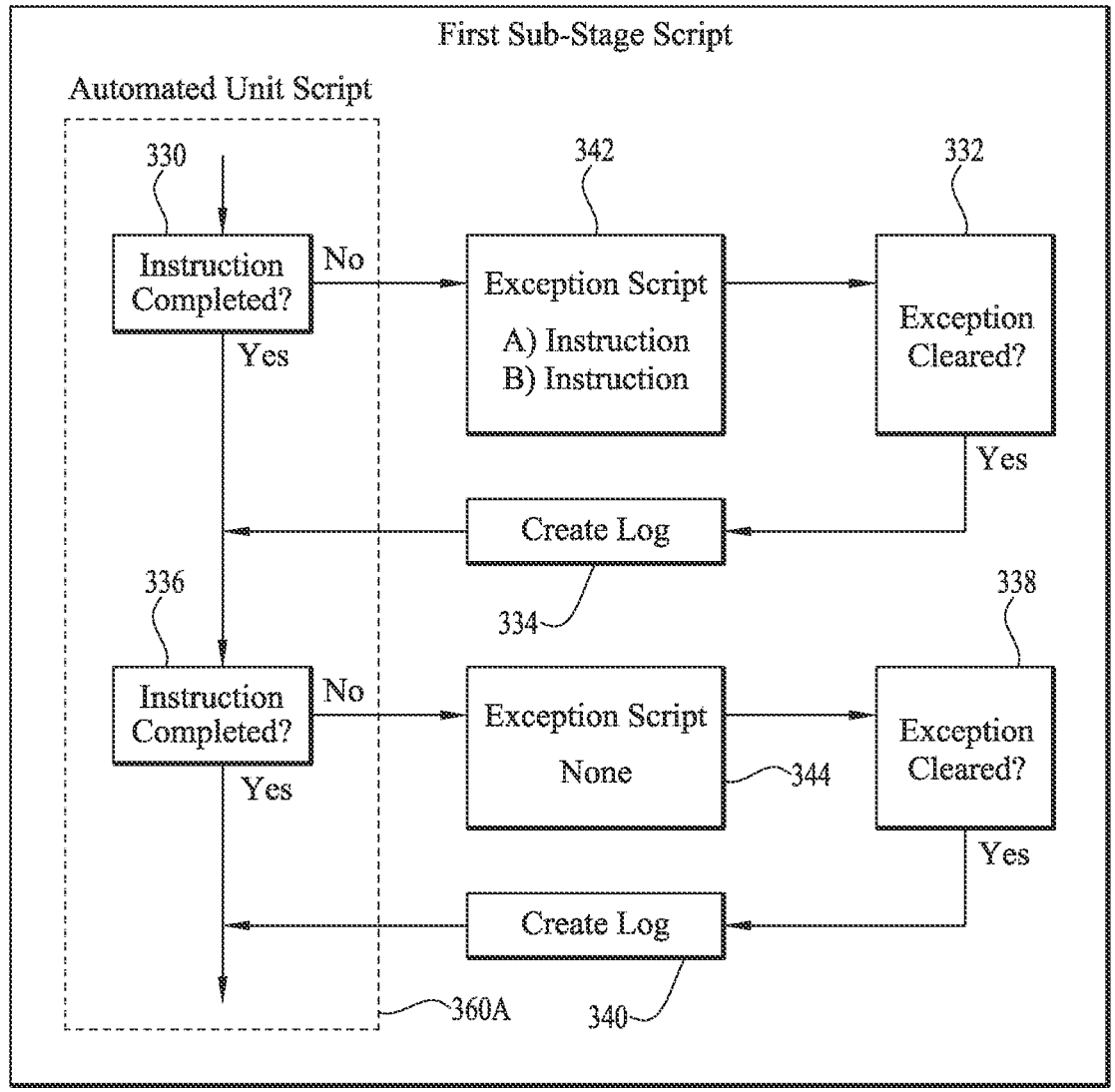
FIG. 8 is a logical flow diagram depicting an automated unit script with automated exception handling for the first sub-stage script according to an embodiment of the disclosure.

The automated pumping script can feature automatic exception handling with an automated sub-script designed to address common or known problems that may result in an exception during automated execution of unit level instructions and related script. Turning now to FIG. 8, in an embodiment, the first sub-stage script 352 with the first automated unit script 360A including automated exception handling is shown in a logical flow diagram. The managing application 136 in the control van 110 can execute the first sub-stage script 352 in a similar manner as described in FIG. 7. The instruction at block 330 may produce an exception and proceed to block 342 to automatically execute an exception script comprised of one or more instructions or commands (e.g., instruction A or instruction B) to clear or mitigate the exception. The exception script at block 342 may be written to clear commonly encountered exceptions that are unit level exceptions, supervisory level exceptions, or stage level exceptions. On or more instructions may be provided for one or more exceptions (e.g., conditions) that may occur. As shown at block 342 an automated instruction script A is provided for automatic execution upon the occurrence of an associated condition A, and an automated instruction script B is provided for automatic execution upon the occurrence of an associated condition B. For example, the exception script at block 342 may be written such that condition A is associated with a problem with of one of the frac pumps 122 due to equipment wear. The automated exception script at block 342 may include instructions (e.g., counterpart automated instruction A) that execute automatically (e.g., without operator intervention) to slow the pump rate of the frac fluids, power down the problematic frac pump 122, and close the isolation valves at the problematic frac pump 122 unit to enable repairs. Block 332 determines if the exception script at block 342 clears the error, and if so then the managing application 111 creates an exception log at block 334 and restarts the automated unit script 360A. If block 332 determines that the exception script at block 342 doesn't clear the error, then the managing application 111 generates an exception at block 332 and returns control to the service personnel.

The automated unit script 360A may generate a second error at block 336 where one or more instructions (e.g., unit level commands) fail to execute properly. The automated unit script 360A may or may not have an exception script at block 344 written for an error at block 336. For example, one or more automated exception scripts (e.g., instructions A and B) may be present at block 344, but may not match the error (e.g., a condition C) from block 336. Alternatively, there simply may not be an automated exception script for each and every instruction contained within an automated unit script 360A. In either instance where an automated exception script is not present (and/or where an automated exception script was unsuccessful in clearing the exception), an exception is generated at block 338 and returns control to the service personnel. The service personnel may clear the exception at block 338 and the managing application 111 generates an exception log at block 340 and restarts the automated unit script 360A.

An automated pumping sequence 350 may follow the same logical steps through each pump stage (e.g., 320) with operational exceptions. Turning now to FIG. 9A, a logical flow diagram depicting an operational method 400 to the automated pumping sequence 350, is described. In an embodiment, the managing application 136 may identify frac units of the frac fleet (of the type shown in FIG. 1A) in a pre-stage automated sequence as described herein.

Prior to or concurrent with block 402, the process flow can begin with the development of a treatment schedule where general objectives from customers are identified and converted into a treatment (e.g., pumping) schedule with appropriate frac spread level (e.g., unit level) limitations. A number of closed loop sequences (e.g., unit level operation) are identified for the treatment schedules and boundaries for each of the treatment schedules are identified. The sequence of the closed loop sequences as well as any transition related criteria between closed loop sequences are identified and included in the treatment schedule. This may happen during the pre-job planning stage, and it may also be modified during the job between stages as treatment data and sensor data from previous stages becomes available with associated insight. This process also ranks various execution criteria from the customer where criteria may include cost, reservoir and formation related targets, acoustic/noise emission targets, exhaust related targets, fuel consumption/efficiency targets when used with dual fuel equipment, and other relevant information. Exception handling may also be discussed where potential exception scenarios are identified with potential mitigation/action steps. Exception handling may be automatic with the option of changing boundaries and/or trigger points for the identified exception step, for example as described with reference to FIG. 8.

At block 402, the automated pumping sequence 350 can be loaded into the managing application 136 executing on the computer 132 within the control van 110. The automated pumping sequence 350 can be received from a remote application (e.g., fracture modeling application 224), retrieved from a remote storage server (e.g., 214), from a local storage server, or on a portable storage device connected to the computer 132 by an operator thereof. The managing application 136 can determine the sequence of pump stages with the stage targets from the automated pumping sequence 350. The automated pumping sequence 350 includes one or more pumping sequences 300 of the type described with reference to FIGS. 5A and 5B, and may comprise a plurality of stages as shown therein. The pumping sequence corresponds to a treatment schedule for a given wellbore, and may be prepared in advance of the scheduled wellbore servicing operation (e.g., frac job). The pumping sequence may be customized based upon various wellbore/formation data and customer requirements as described herein. For example, the stage targets can be a volume of proppant to be pumped into each zone, a maximum pressure value based on proppant density, or a pump rate value with maximum pressure value.

At block 404, the managing application 136 can identify the frac units at the wellsite 202. The frac units can be identified by a unique identifier within the unit control module (e.g., the unit control module 142 of the water supply unit 112), RFID tags, GPS trackers, internet of things (IOT) device identifiers, EDGE devices (e.g., routers), bar codes, or manual entry of equipment identifiers. The identified equipment may be cross checked with databases for specifications, equipment ratings, maximum/recommended loads, fuel efficiency curves, fuel replacement curves when used with dual fuel equipment, noise emission profiles, exhaust emission profiles and other data relevant to automatic execution and optimization of the identified frac job and associated pumping sequence.

At block 406, the managing application 136 can assign the frac units to the automated pumping sequence 350. The unit control module of each frac unit (e.g., the unit control module 142 of the water supply unit 112) can be assigned an automated unit script (e.g., automated unit script 360A) within the automated pumping sequence 350. For example, the automated unit script 360A can control the water supply unit 112 with instructions to the unit control module 142.

At block 408, the managing application 136 can then select the frac units to optimize the automated pumping sequence 350 based on customer criteria. The system will select equipment for the frac job based on selected criteria where the most efficient equipment or the most efficient combination(s) of equipment will be used for job execution. The customer criteria may include cost, acoustic/noise emission limits, exhaust related targets, fuel consumption/efficiency targets, and proppant volume targets. Furthermore, the managing application may select frac units to be held in reserve or as spare equipment in case of equipment failure. The process may also identify the sequence of what spare equipment to allocate for various exception steps, for example in conjunction with the automatic exception handling of the type described with reference to FIG. 8.

If the managing application 136 determines the pumping sequence is not optimized, the managing application 136 proceeds to block 410. At block 410, the managing application checks for an exception (e.g., block 332 of the automated unit script 360A). The managing application 136 may ask the user (e.g., service personnel) if they want to change the frac units and proceeds back to block 406. If the user does not change the frac units assigned to the automated pumping sequence 350, the managing application 136 can return an exception at block 410 and return the user to block 404 to identify new equipment that will meet the inputted criteria. After the frac units have been optimized, the managing application 136 continues to block 412 to begin a pumping sequence such as pumping sequence 300 of FIGS. 5A and 5B.

The general process flow of FIG. 9 outlines how a frac job is automatically executed from start to finish with minimum/no manual intervention. The process flow includes a number of sequential operations that may be divided into individual sub-process and a stage executes a number of these subprocesses. Subprocesses include but are not limited to: pressure test of individual pumps; prime up; pressure test of all pumps/blenders/missile; use of Prodigi AB (Automated Breakdown) intelligent fracturing software to model/simulate fractures; ramp up fluid pumping (prop ramp w/pressure, prop ramp w/DAS); pump liquid/proppant/chemicals per treatment schedule; drop diverter and manage unit level equipment per selected diversion exception schedule; ACM—Automated Completion Monitoring, a sequence of diverter drops and rate/pressure adjustments to keep treating pressure within an upper/lower bound of pressure; and ramp down fluid pumping.

Turning now to FIG. 9B (which is a continuation of FIG. 9A), the logical flow diagram continues. At block 412, the managing application 136 can begin the automated pumping sequence 350. At block 414, the managing application 136 can query all or a portion of the equipment data sensors. For example, the managing application 136 can connect with and retrieve data from the unit sensor module 144 of the water supply unit 112. The managing application 136 may return an exception if the one or more of the frac unit data sensors are not operational, and the exception may be handled, for example, in accordance with the discussion of exception handling in the context of FIGS. 7 and 8.

At block 416, the managing application 136 begins the stage script (e.g., sub-stage script 352 from FIG. 6). The sub-stage script 352 contains the unit level instructions (e.g., unit script 360A-Z) for the pumping stage (e.g., first sub-stage 320 in FIG. 5B). A supervisory link 362 can link the instructions to two or more unit scripts 360A-Z. At block 418, the managing application 136 establishes a target for each of the frac units by the sub-stage script 352. The target can be the same or different for each frac unit (e.g., designated pumping rates for each of the high pressure frac pumps 122). For example, the water supply unit 112 may be given a water flow rate target for the water supply pump 148. At block 420, the managing application 136 monitors the data from the equipment data modules (e.g., unit sensor module 144) to establish a total fluid flow or combined pumping rate as well as compositional characteristics of the fluid being pumped. The established rate can be a constant rate, an increasing rate, a decreasing rate, or an idle rate, for example as shown in FIGS. 5A and 5B. Likewise, the composition of the fracturing fluid (e.g., amount of proppant, amount of gelling agent, amount of friction reducer, etc.) can be held constant or changed, for example as shown in FIGS. 5A and 5B. At block 422, the managing application 136 can compare the established frac fluid rate and/or composition at block 420 to the modeled frac fluid rate and/or composition within the stage script at block 416. If the established rate and/or composition at block 420 differs from the modeled rate and/or composition, the managing application 136 proceeds to block 424.

At block 424, the managing application 136 can hold the target rate constant or modify the target rate and return to block 420. For example, if a target concentration of proppant may cause a premature sand out, the managing application 136 can lower the concentration of proppant. The managing application 136 can proceed from comparing to the model at block 422, to modifying the rate at block 424, to establishing a rate at block 420 and proceed to comparing to the model at block 422 in a rapid fashion in order to complete the stage script at block 416. When the established rate matches the modeled rate, the managing application 136 can proceed to block 436.

At block 436, the managing application 136 can determine if the target load has been met. For example, the managing application 136 can determine if the target volume of frac fluids has been pumped and/or if a target amount of proppant (e.g., total pounds) has been placed into the perforations and associated fractures currently being propped. If the target load has not been met, the managing application can proceed to block 418 and the fracturing of the particular stage can continue. If the target load has been achieved, the managing application 136 can proceed to block 426.

Turning now to FIG. 9C (which is a continuation of FIG. 9B), at block 426 the managing application 136 can determine if the pumping stage (e.g., sub-stage 320) has been completed. If the pumping stage has not been completed, the managing application 136 can return to the beginning of the stage script (e.g., sub-stage script 352) at block 416 to execute one or more additional instructions or commands as contained (e.g., coded) in the stage script. For example, the sub-stage script 352 can include pumping several volumes of chemicals (e.g., corresponding to compositional differences in the fracturing fluid corresponding to use thereof at a given time during a fracturing stage, e.g., ramp up, steady state or ramp down) and the managing application 136 can determine that the first chemical volume of three chemicals has been completed (or the first concentration of proppant has been placed of three different proppant concentration in pound per gallon) and returns to the beginning of the sub-stage script 352 for the next volume of chemicals or proppant concentration. The managing application 136 may determine an exception has occurred and proceeds to block 434. At block 434, the exception may cause the managing application 136 can abandon the pumping stage and return to the automated pumping sequence 350 at block 412. For example, the managing application 136 may detect a sand out has occurred within the wellbore. A sand out occurs when the formation prevents the proppant laden frac fluid from entering into the fractures. The managing application 136 may end the pumping stage and return control to the user (e.g., service personnel). Alternatively, the managing application 136 may automatically clear the exception by executing an automated exception script, where applicable, and the method can return to block 426. If the managing application 136 determines the stage is complete, the managing application 136 proceeds to block 428.

At block 428, the managing application 136 can generate a report of the stage completed. The report may include the volumes of proppant, chemicals, and water pumped. The report may include a comparison between the model targets and the actual targets achieved. At block 430, the managing application 136 can determine if the pumping sequence is completed. If the pumping sequence is not complete, the managing application 136 can return to block 412 to continue to the next pumping stage. If the pumping sequence has been completed, the managing application 136 can proceed to block 432.

At block 432, the managing application 136 can generate an end of job report. The report may include a report for each pump stage completed. The end of job report may include a comparison between the model targets and the actual targets for each stage of the fracturing job.

An automated pumping sequence 350 may follow the same logical steps through each pump stage (e.g., 320) with operational exceptions for additional customer input and for modifying the automated pumping sequence 350. Turning now to FIG. 10A, a logical flow diagram depicting an operational method 600 to the automated pumping sequence 350 is described. In an embodiment, the managing application 136 may execute multiple closed loop sequences that control the operation of the frac units of the frac fleet (of the type shown in FIG. 1A) with an automated sequence as described herein. In an embodiment, the process flow (e.g., FIG. 10) can include multiple operational exceptions. Exceptions can interrupt or modify one or more sub-processes, pumping stages (e.g., 320), and automated pumping sequence 350 in real time including new stage execution targets. Exception events may include: (i) equipment related where equipment performance may drive load (e.g., amount of frac fluid pumped) re-allocation. Wear and tear on one piece of equipment (e.g., frac pump) may increase the risk for failure so it may be beneficial to change target load (e.g., amount of frac fluid pumped) on said piece of equipment to reduce the risk of failure/further load reduction and thereby increase the probability of a successful execution of the current job; (ii) loss of unit level equipment (e.g., frac pump) where target set points may need to change if, for example, one pump goes down and proppant concentration may need to be reduced to avoid screen-out (e.g., proppant plugging perforation entrance) etc. The load (e.g., amount of frac fluid pumped) from one piece of equipment may be re-distributed across multiple equipment units (e.g., frac pumps) already operating and this re-distribution may be permanent for the stage or temporary while additional spare equipment (e.g., frac pump) is being added to the configuration; (iii) change the target set-points due to sensor data from the treatment well indicating that a screen-out (e.g., proppant plugging the perforation entrance) is likely to occur. (iv) modifying the treatment schedule due to sensor data from the treatment well indicating a change in volume of proppant entering the formation, risk of equipment failure, or loss of pumping equipment. The treatment schedule modification can include changing duration of treatment schedules to compensate for changes in proppant rates in order to place a predetermined volume of proppant, due to a change in proppant volume, due to a manual input, or due to the modeling application modification (e.g., Smartfleet); (v) loss of equipment (e.g., frac pump) where additional spare equipment needs to be activated and the spread needs to be load balanced per target criteria, for example, a frac pump must be shut down and the amount of frac fluid pumped needs to be split between existing frac pumps; (vi) changes to desired spread optimization parameters either determined and input automatically by managing application 136 (e.g., Expert System) or input manually by user; (vii) set points may be changed by user input and communicated into the exception handling process; or (viii) any combination of (i)-(vii).

At block 602, the process flow can begin with the development of a treatment schedule where general objectives from customers are identified and converted by a user (e.g., service personnel) into a treatment (e.g., pumping) schedule with appropriate frac spread level (e.g., unit level) limitations. A number of closed loop sequences (e.g., unit level operation) are identified by the user for the treatment schedules and boundaries for each of the treatment schedules are identified. The sequence of the closed loop sequences as well as any transition related criteria between closed loop sequences are identified and included by the user in the treatment schedule. This may happen during the pre-job planning stage, and it may also be modified during the job between stages as treatment data and sensor data from previous stages becomes available with associated insight. This process also ranks various execution criteria from the customer where criteria may include cost, reservoir and formation related targets, acoustic/noise emission targets, exhaust related targets, fuel consumption/efficiency targets when used with dual fuel equipment, and other relevant information. The process flow can return to this block when an exception is detected. The response to the exception may include a change in target set points, a change in equipment, a re-allocation of treatment schedules, or a change in set points based on user inputs. Exception handling may be automatic with the option of changing boundaries and/or trigger points for the identified exception step, for example as described with reference to FIG. 8.

At block 604, the managing application will identify available equipment on location using various means of identification which may include one or more of the following: RFID tags, GPS trackers, IOT devices, EDGE devices, scanning bar codes, or manual entry of equipment as needed. The equipment may be cross checked with data bases for specifications, equipment ratings, maximum/recommended loads, fuel efficiency curves, fuel replacement curves when used with dual fuel equipment, noise emission profiles, exhaust emission profiles and other data relevant to automatic execution and optimization of the identified job.

At block 606, the system will then select equipment for the job based on selected criteria where the most efficient equipment or the most efficient combination(s) of equipment will be used for job execution. The process may also identify the sequence of what spare equipment to allocate for various exception steps.

At block 608, the managing application 136 can optimize the automated pumping sequence 350 by selecting the frac units based on customer criteria. The system will select equipment for the frac job based on selected criteria where the most efficient equipment or the most efficient combination(s) of equipment will be used for job execution. The customer criteria may include cost, acoustic/noise emission limits, exhaust related targets, fuel consumption/efficiency targets, and proppant volume targets. Furthermore, the managing application may select frac units to be held in reserve or as spare equipment in case of equipment failure. The process may also identify the sequence of what spare equipment to allocate for various exception steps, for example in conjunction with automatic exception handling of the type described with reference to FIG. 8.

At block 610, if the managing application 136 determines that the selected units are not optimized based on customer criteria or if the customer provided additional criteria, the managing application can use a second criteria or additional criteria provided by the customer. The system can return to block 606 to select equipment.

At block 612, the managing application 136 can begin the automated pumping sequence 350.

At block 614, the managing application 136 can query all or a portion of the equipment data sensors. For example, the managing application 136 can connect with and retrieve data from the unit sensor module 144 of the water supply unit 112. The managing application 136 may return an exception if the one or more of the frac unit data sensors are not operational, and the exception may be handled, for example, in accordance with the discussion of exception handling in the context of FIGS. 7 and 8.

At block 616, the managing application 136 can execute a number of sequential operations that may be divided into individual sub-processes during a pumping stage. The sub-processes within the stage include, but are not limited to: i.) pressure test of individual pumps. For example, one or more frac pumps can be filled with a fluid (e.g., water or frac fluid), isolated by closing of one or both isolation valves (e.g., isolation valve 104), and pressure applied to observe the pressure lines and connections for leaks. ii.) Prime up. For example, all of the fluid handling equipment and fluid lines of the frac units can be filled with a fluid (e.g., water or frac fluid) and the fluid can be circulated to remove air pockets that could cause pump cavitation. iii.) Pressure test of all pumps, blenders, and manifold (e.g., missile). For example, all of the fluid handling equipment and fluid lines of the frac units can be isolated by closing of an isolation valves (e.g., isolation valve 104) between the manifold and wellhead and pressure applied from one of the pumps (e.g., water supply pump 148) to observe the pressure lines and connections for leaks. iv.) Subprocess for controlled pump rate for proppant placement. For example, the managing application 134 can execute a subprocess to dynamically adjust pump rate and rate of change between pump rates based on sensor data from downhole sensors (e.g., DAS with fiber optic cable proximate the perforations) to maximize the amount of proppant pumped into the fractures. In an aspect, the subprocess can be Prodigi AB by Halliburton. v.) Subprocess for ramp up of proppant density. For example, the amount of proppant added to the frac fluid to increase the proppant density can be controlled by the pressure data from one or more pressure sensors such as a sensor attached to the production tree or a downhole pressure sensor. vi.) Subprocess for pumping frac fluids, treatment, and other frac liquids per treatment schedule. For example, the managing application 136 monitors the data from the equipment data modules (e.g., unit sensor module 144) to establish a total fluid flow or combined pumping rate as well as compositional characteristics of the fluid being pumped. The established rate can be a constant rate, an increasing rate, a decreasing rate, or an idle rate, for example as shown in FIGS. 5A and 5B. Likewise, the composition of the fracturing fluid (e.g., amount of proppant, amount of gelling agent, amount of friction reducer, etc.) can be held constant or changed, for example as shown in FIGS. 5A and 5B. vii.) Subprocess for dropping a diverter and managing treatment of the zone for addition of the diverter. For example, the managing application 136 initiates the addition of a diverter treatment with additional treatment fluids, monitors sensor data from the treatment well, monitors the data from the equipment data modules (e.g., unit sensor module 144) to establish a total fluid flow or combined pumping rate for the change in pumping behavior based on the characteristics of the diverter treatment and fluid being pumped. viii.) Subprocess for dropping multiple diverter treatments for a zone with a managed pressure limit. For example, the managing application 136 initiates the addition of a diverter treatment, monitors the sensor data from the treatment well, monitors data from the equipment data modules (e.g., unit sensor module 144) to establish a treatment flow rate with an upper and lower treatment pressure limit. The managing application 136 can drop 2, 3, 4, or any number of diverter treatments within the subprocess. ix.) Subprocess for ramp down of proppant density and treatment fluids. For example, the amount of proppant added to the frac fluid to decrease the proppant density can be controlled by the combined sensor data from the treatment well, such as a sensor attached to the production tree or a downhole pressure sensor, and the equipment data modules (e.g., unit sensor module 144).

At block 618, the managing application 136 can activate the frac fleet equipment including the pumps based on selection criteria and engage the equipment per a predetermined sequence (e.g., automated pumping sequence 350), model selection, model output, sub-process, or exception result.

At block 620, the managing application 136 can receive and/or reconfirm operational target, frac spread set point per closed loop control target or change set point per exception request.

At block 622, the managing application 136 can engage the frac fleet equipment and/or pumps to achieve target revolutions per minute (RPMs) of the frac pump crankshaft while monitoring equipment data and downhole sensor data and exception requests. The managing application 136 may return an exception and step to block 626 if one or more of the frac unit data sensors fail to achieve the target RPMs.

At block 624, the managing application 136 can manage gear transition and state of the transmission of one or more frac pumps to achieve target criteria while monitoring equipment data, downhole sensor data, and exception requests. The managing application 136 may return an exception and step to block 626 if one or more of the frac unit data sensors detect a fault in the transmission or gear transition.

At block 626, the managing application 136 can receive an exception that causes the managing application 136 to abandon the pumping operation and return to the beginning of the process flow at block 602. For example, the managing application 136 may detect the loss of unit level equipment due to a transmission failure. The managing application 136 may end a subprocess of a stage and return control to the user (e.g., service personnel). Alternatively, the managing application 136 may end the first subprocess and begin a second subprocess that modifies the pumping operation (e.g., an automated exception script) and returns to block 602.

At block 628, the managing application 136 can determine if the subprocess has completed. For example, the managing application 136 can determine if the target volume of frac fluids has been pumped and/or if a target amount of proppant (e.g., total pounds) has been placed into the perforations and associated fractures currently being propped. If the target load has not been met, the managing application can return to block 620 and the fracturing of the particular stage can continue. If the target load has been achieved, the managing application 136 can proceed to block 632. The managing application 136 may return an exception and step to block 630 if the target load can't be achieved. For example, if the subprocess determines by sensor data from the treatment well that a screen out (e.g., a proppant plug forms at the perforations) is likely to occur.

At block 630, the managing application 136 can receive an exception from the user, the modeling application, or from block 628 that causes the managing application 136 to abandon the pumping operation and return to block 620. The managing application 136 may end a subprocess of a stage and return control to the user (e.g., service personnel). Alternatively, the managing application 136 may end the first subprocess and begin a second subprocess that modifies the pumping operation (e.g., an automated exception script) and returns to block 620.

At block 632, the managing application 136 can determine if the pumping stage (e.g., sub-stage 320) has been completed. If the pumping stage has not been completed, the managing application 136 can step to block 634 to execute one or more additional subprocesses (e.g., closed loop sequences). For example, the sub-stage script 352 can include pumping several volumes of chemicals (e.g., corresponding to compositional differences in the fracturing fluid corresponding to use thereof at a given time during a fracturing stage, e.g., ramp up, steady state or ramp down) and the managing application 136 can determine that the first chemical volume of three chemicals has been completed (or the first concentration of proppant has been placed of three different proppant concentration in pound per gallon) and returns to the beginning of the sub-stage script 352 for the next volume of chemicals or proppant concentration. The managing application 136 may determine an exception has occurred and proceeds to block 636. At block 636, the exception may cause the managing application 136 to abandon the pumping stage and return to the automated pumping sequence 350 at block 618. For example, the managing application 136 may detect a sand out has occurred within the wellbore. A sand out occurs when the formation prevents the proppant laden frac fluid from entering into the fractures. The managing application 136 may end the pumping stage and return control to the user (e.g., service personnel). Alternatively, the managing application 136 may automatically clear the exception by executing an automated exception script, where applicable, and the method can return to block 618. If the managing application 136 determines the stage is complete, the managing application 136 proceeds to block 638.

At block 634, the managing application 136 can start a subprocess (e.g., a closed loop sequence) subsequent to the subprocess that ended. The managing application can proceed to block 618 to engage the equipment per the subprocess At block 638, the managing application 136 can the managing application 136 can generate a report of the stage completed. The report may include the volumes of proppant, chemicals, and water pumped. The report may include a comparison between the model targets and the actual targets achieved, model updates, and configuration changes.

At block 640, the managing application 136 can determine if the pumping sequence is completed. If the pumping sequence is not complete, the managing application 136 can proceed to block 642 to continue to the next pumping stage. The managing application 136 may determine an exception has occurred and proceeds to block 644. If the pumping sequence has been completed, the managing application 136 can proceed to block 648.

At block 642, the managing application 136 can load the next pumping stage from the automated pumping sequence 350 and proceed to block 612.

At block 644, the exception may cause the managing application 136 to abandon the pumping stage and return to the automated pumping sequence 350 at block 612. For example, the managing application 136 may detect a sand out has occurred within the wellbore. A sand out occurs when the formation prevents the proppant laden frac fluid from entering into the fractures. The managing application 136 may end the pumping stage and return control to the user (e.g., service personnel). Alternatively, the managing application 136 may automatically clear the exception by executing an automated exception script, where applicable, and the method can return to block 612.

At block 646, an exception can be a user input or a modeling application input. The user may change the set points, modify a subprocess (e.g., closed loop sequence), modify a frac stage, modify the targets, or modify the number of stages. The modeling application can modify stage treatment schedules based on sensor data from the treatment well. The modeling application can modify associated parameter targets and sequence target set points as needed for sequential closed loop controls based on sensor data from the treatment well. Sensor data may include a combination of surface sensors (e.g., wellhead isolation tool) and downhole sensors in the treatment well. For example, if a frac pump has an increased risk of failure, the target load (e.g., amount of frac fluid pumped) by the frac pumps can be decreased to reduce the risk of equipment failure. The target load (e.g., amount of frac fluid pumped) reduction can modify one or more targets of a given pumping stage (e.g., 320). For example, the managing application 136 can change the target set points due to the loss of unit level equipment (e.g., a frac pump failure). The managing application 136 can reduce the proppant concentration to avoid a screen-out (e.g., premature proppant plugging). The pumping volume may be re-distributed across the remaining equipment units and this re-distribution may be permanent for one or more stages or may be temporary until additional spare equipment is added to the pumping system. For example, the managing application 136 can change the target set-points due to sensor data from the treatment well indicating that a screen-out (e.g., proppant plugging the perforation entrance) is likely to occur. For example, the managing application 136 can modify the treatment schedule due to sensor data from the treatment well indicating a change in volume of proppant entering the formation, risk of equipment failure, or loss of pumping equipment. The treatment schedule modification can include changing duration of treatment schedules to compensate for changes in proppant rates in order to place a predetermined volume of proppant, due to a change in proppant volume, due to a manual input, or due to the modeling application modification (e.g., Smartfleet). The managing application 136 can receive an exception from the user or modeling application that causes the managing application 136 to return to one of block 644, block 636, block 630, or block 602 based on the when within the automated pumping sequence 350 the exception occurred. For example, the managing application 136 can return to block 630 if the excepting occurred during a closed loop sequence. The managing application 136 can return to block 636 if the exception occurred outside a closed loop sequence but during a pumping stage (e.g., sub-stage 320). The managing application 136 can return to block 644 if the exception occurred outside a pumping stage but during the automated pumping sequence 350. The managing application 136 can return to block 602 if the exception modifies the equipment utilized, modifies the number of stages, or modifies the treatments utilized in the automated pumping sequence 350.

At block 648, the managing application 136 can generate an end of job report. The end of job report may include a report of each stage, a comparison between the model targets and the actual targets for each stage, recommended model updates, and a list of critical maintenance for the frac fleet equipment.

A modeling application may establish a pumping sequence for the automated pumping sequence 350 for the pumping operation of a treatment well. In an embodiment, the automated pumping sequence 350 provided on block 402 of FIG. 9 and block 602 of FIG. 10 is prepared by a fracture modeling application 224 of FIG. 4, for example in accordance with the disclosure of co-pending U.S. application Ser. No. 17/066,851, entitled "Expert System for Well Treatment" and incorporated herein by reference in its entirety. The fracture modeling application 224 can determine a pumping sequence 300 of FIG. 5 based on user inputs of the treatment well description and the customer optimization criteria. The managing application 134 can create the automated pumping sequence 350 from the pumping sequence 300 provided by the fracture modeling application 224.

In an embodiment, the fracture modeling application 224 (e.g., Smartfleet) can modify the automated pumping sequence 350. The automated pumping sequence 350 can be modified by the fracture modeling application 224 at block 424 of FIG. 9 and block 646 of FIG. 10 based on sensor data from the treatment well, for example in accordance with the disclosure of co-pending U.S. application Ser. No. 17/066,851, entitled "Expert System for Well Treatment" and incorporated herein by reference in its entirety. The fracture modeling application 224 can modify a subprocess (e.g., closed loop sequence), end a subprocess, begin a subprocess, issue an exception, or any combination thereof.

An automated pumping sequence 350 may follow the same logical steps through each pump stage (e.g., 320) while fracturing multiple wellbores (e.g., separate and distinct wells, separate wellbores (e.g., lateral wellbores) sharing a common vertical portion or wellhead, or combinations thereof). In an embodiment, a control van 110 of FIG. 1A can be connected to a first set of frac units (e.g., a first frac fleet) and a second set of second frac units (e.g., a second frac fleet). The first frac fleet can be connected to a first treatment well 130 for a hydraulic fracturing treatment. The second frac fleet can be connected to a second treatment well for a hydraulic fracturing treatment. The automated pumping sequence 350 can direct a simultaneous fracture treatment of the first and second treatment well (e.g., 130) or the sequential treatment of the first and second well. In an aspect, the first and second treatment wells can be treated in a combination of simultaneous or sequential fracturing stages where the fracturing fluid can be pumped into the first and second treatment wells simultaneously in some stages or sub-stages, sequentially in some stage or sub-stages, or combinations thereof in accordance with a pumping sequence associated with the fracturing job.

In an embodiment, the managing application 136 can determine the sequence of pump stages with stage targets from the automated pumping sequence 350 for a sequential treatment. The managing application 136 (e.g., pumping sequence control 162 from FIG. 3) can establish supervisory control 164 and unit level control 166A-Z on a first frac fleet and on a second frac fleet. The automated pumping sequence 350 can direct the first frac fleet to treat (e.g., pump frac fluid) a first zone in the first treatment well 130, then direct the second frac fleet to treat (e.g., pump frac fluid) a first zone in the second treatment well. The managing application 136 can receive sensor data from the first treatment well 130 and second treatment well during the treatment of the first treatment well 130. The managing application 136 can receive sensor data from the first treatment well 130 and second treatment well during the treatment of the second treatment well. The managing application 136 can modify one or more of the subprocesses (e.g., closed loop pump sequences for the first well, the second well, or both) based on the sensor data received from one or more wellbores.

In an embodiment, the managing application 136 can determine the sequence of pump stages with stage targets from the automated pumping sequence 350 for a simultaneous treatment. The managing application 136 (e.g., pumping sequence control 162 from FIG. 3) can establish supervisory control 164 and unit level control 166A-Z on a first frac fleet and on a second frac fleet. The automated pumping sequence 350 can direct the first frac fleet to treat (e.g., pump frac fluid) a first zone in the first treatment well 130 while simultaneously, or near simultaneously, directing the second frac fleet to treat (e.g., pump frac fluid) a first zone in the second treatment well. The managing application 136 can receive sensor data from the first treatment well 130 and second treatment well during the near simultaneous treatment of the first treatment well 130 and second treatment well. The managing application 136 can modify one or more of the subprocesses (e.g., closed loop pump sequences for the first well, second well, or both) based on the sensor data received from one or more wells.

Figure 11:
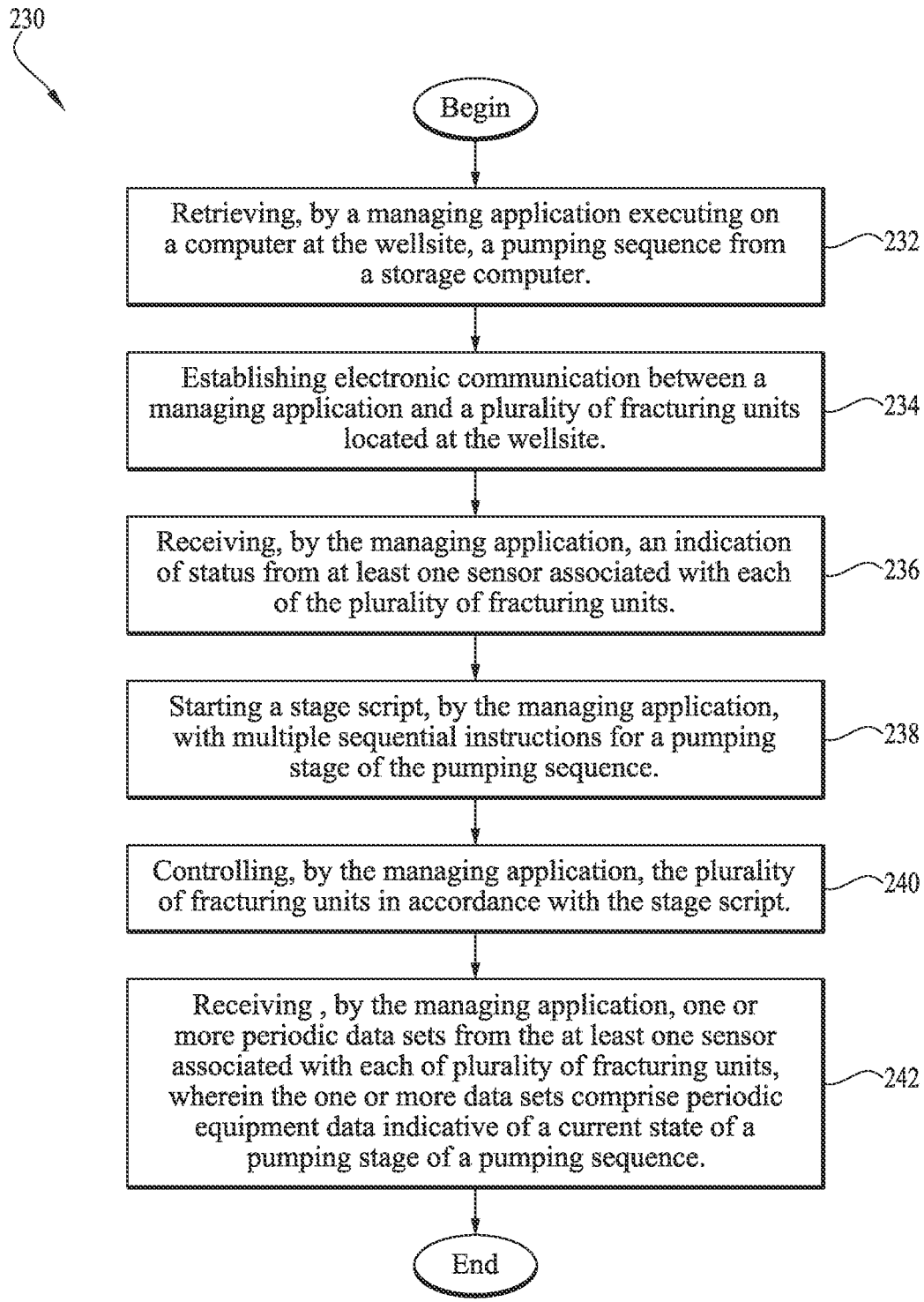
FIG. 11 is a flow chart of a method of controlling a pumping sequence of a fracturing fleet at a wellsite according to an embodiment of the disclosure.

Turning now to FIG. 11, a method 230 is described. In an embodiment, the method 230 is method of controlling a pumping sequence of a fracturing fleet at a wellsite. At block 232, the method 230 comprises retrieving, by a managing application executing on a computer at the wellsite, a pumping sequence from a storage computer.

At block 234, the method 230 comprises establishing electronic communication between a managing application and a plurality of fracturing units located at the wellsite. At block 236, the method 230 comprises receiving, by the managing application, an indication of status from at least one sensor associated with each of the plurality of fracturing units.

At block 238, the method 230 comprises starting a stage script, by the managing application, with multiple sequential instructions for a pumping stage of the pumping sequence. At block 240, the method 230 comprises controlling, by the managing application, the plurality of fracturing units in accordance with the stage script.

At block 242, the method 230 comprises receiving, by the managing application, one or more periodic data sets from the at least one sensor associated with each of plurality of fracturing units, wherein the one or more data sets comprise periodic equipment data indicative of a current state of a pumping stage of a pumping sequence.

Figure 12:
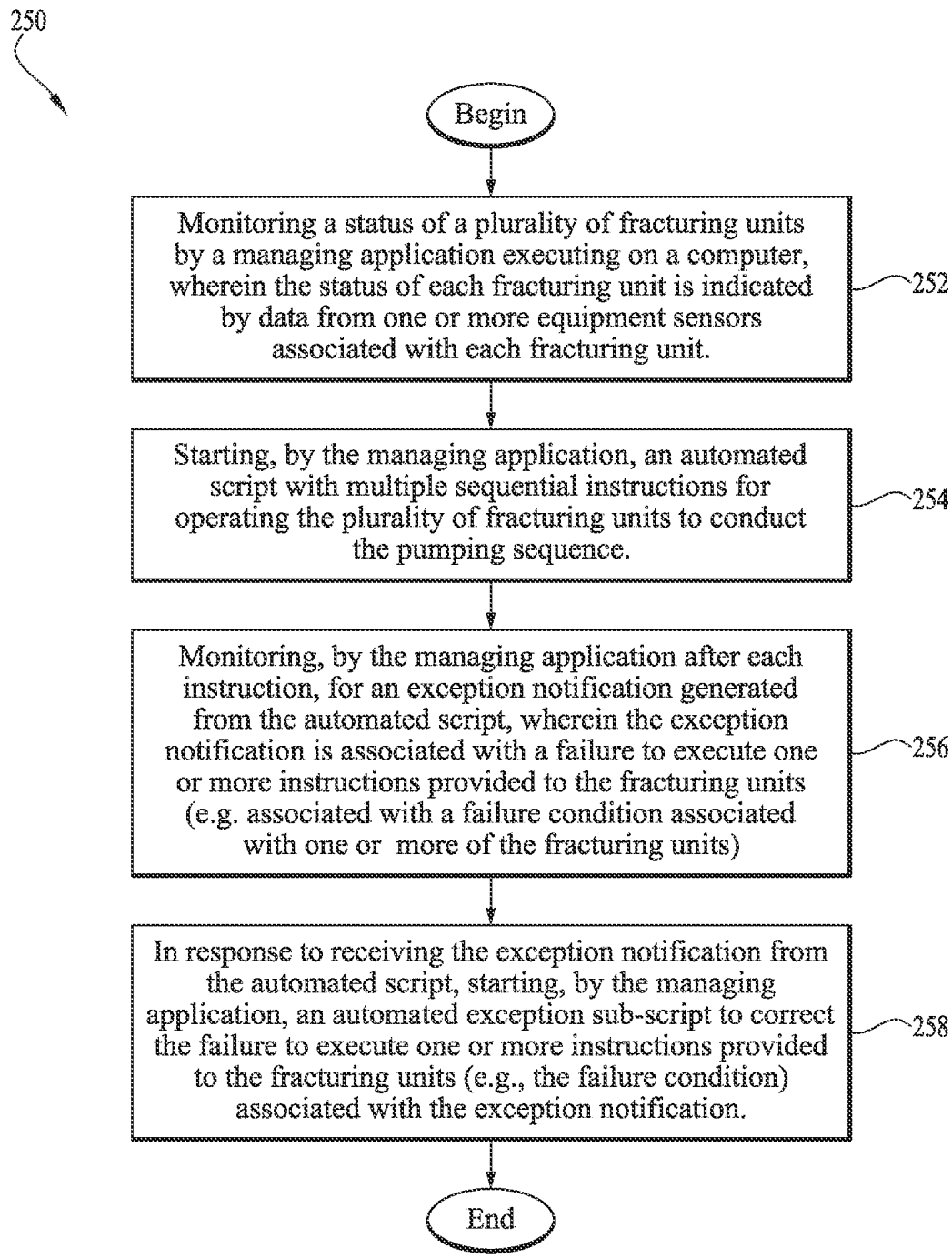
FIG. 12 is a flow chart of another method of controlling a pumping sequence of a fracturing fleet at a wellsite according to an embodiment of the disclosure.

Turning now to FIG. 12, a method 250 is described. In an embodiment, the method 250 is a method of controlling a pumping sequence of a fracturing fleet at a wellsite.

At block 252, the method 250 comprises monitoring a status of a plurality of fracturing units by a managing application executing on a computer, wherein the status of each fracturing unit is indicated by data from one or more equipment sensors associated with each fracturing unit.

At block 254, the method 250 comprises starting, by the managing application, an automated script with multiple sequential instructions for operating the plurality of fracturing units to conduct the pumping sequence.

At block 256, the method 250 comprises monitoring, by the managing application after each instruction, for an exception notification generated from the automated script, wherein the exception notification is associated with a failure to execute one or more instructions provided to the fracturing units (e.g., associated with a failure condition associated with one or more of the fracturing units.

At block 258, the method 250 comprises in response to receiving the exception notification from the automated script, starting, by the managing application, an automated exception sub-script to correct the failure to execute one or more instructions provided to the fracturing units (e.g., the failure condition) associated with the exception notification.

Figure 13:
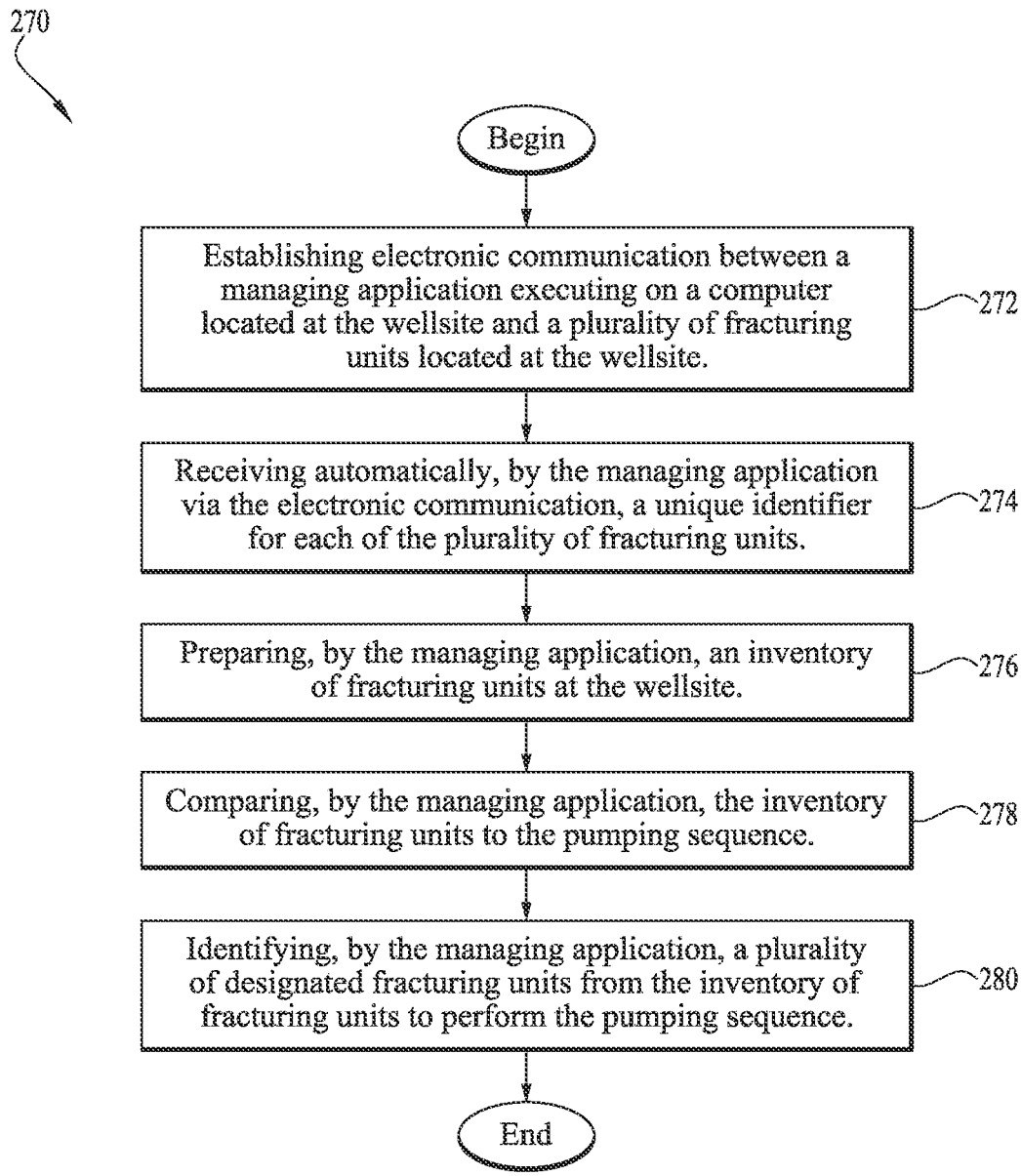
FIG. 13 is a flow chart of still another method of controlling a pumping sequence of a fracturing fleet at a wellsite according to an embodiment of the disclosure.

Turning now to FIG. 13, a method 270 is described. In an embodiment, the method 270 is a method of controlling a pumping sequence of a fracturing fleet at a wellsite.

At block 272, the method 270 comprises establishing electronic communication between a managing application executing on a computer located at the wellsite and a plurality of fracturing units located at the wellsite.

At block 274, the method 270 comprises receiving automatically, by the managing application via the electronic communication, a unique identifier for each of the plurality of fracturing units.

At block 276, the method 270 comprises preparing, by the managing application, and inventory of fracturing units at the wellsite.

At block 278, the method 270 comprises comparing, by the managing application, the inventory of fracturing units to the pumping sequence.

At block 280, the method 270 comprises identifying, by the managing application, a plurality of designated fracturing units from the inventory of fracturing units to perform the pumping sequence.

Figure 14A:
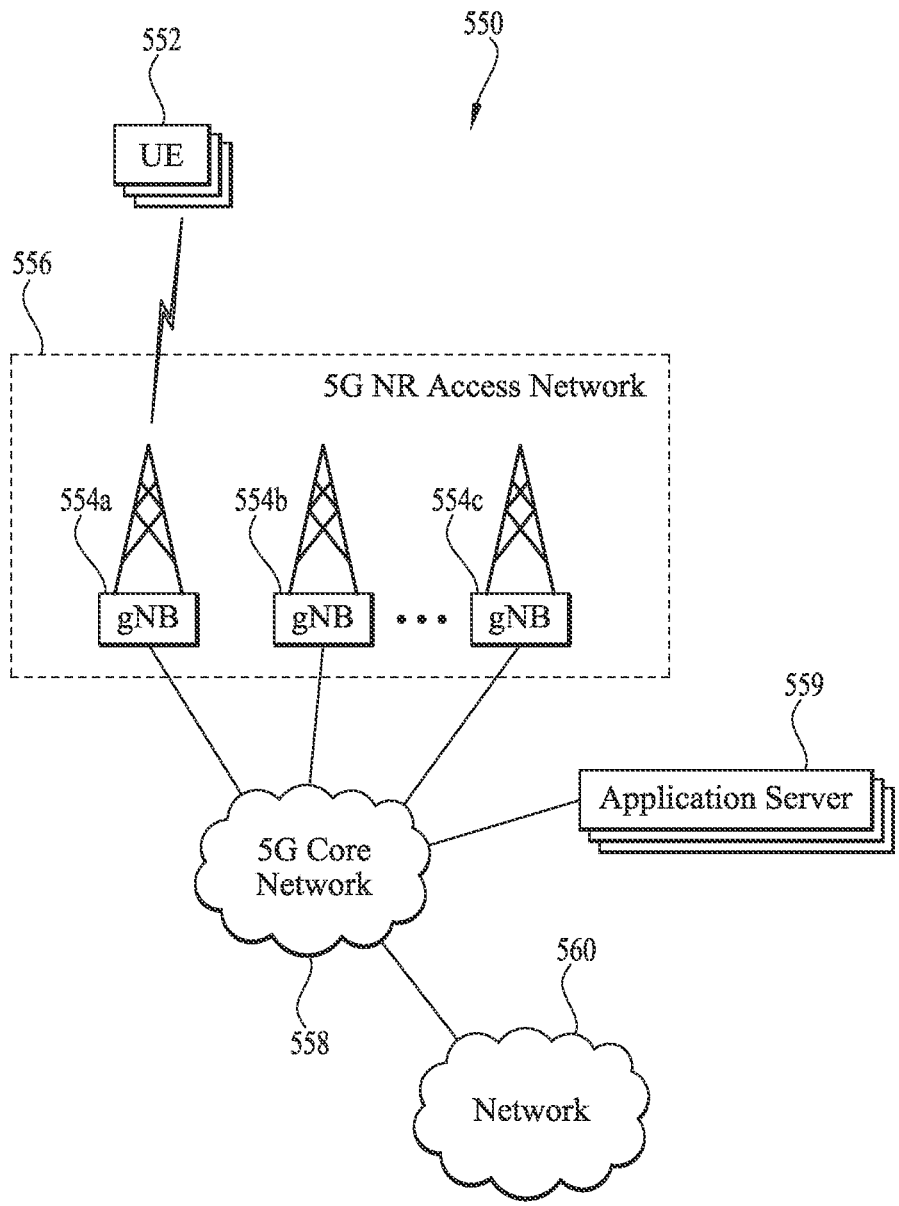
FIG. 14A is a block diagram of an exemplary communication system according to an embodiment of the disclosure.

Turning now to FIG. 14A, an exemplary communication system 550 is described suitable for implementing one or more embodiments disclosed herein, for example implementing communications or messaging as disclosed herein including without limitation any communications with the wellsite of FIG. 1A (e.g., control van 110 and associated computing systems); any aspect of communications with a unit level control system as shown in FIG. 2 (e.g., controller 150, sensors 152); any aspect of communications with the computing components and network associated with FIG. 4 (e.g., data communication system 200); etc. Typically, the communication system 550 includes a number of access nodes 554 that are configured to provide coverage in which user equipment (UE) 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an enhanced Node B (eNB). In 3G technology (.e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mm Wave (e.g., frequency bands above 24 GHZ), and/or other features, to support higher data rates and countless applications, such as mission-critical services, enhanced mobile broadband, and massive Internet of Things (IOT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IOT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 14B:
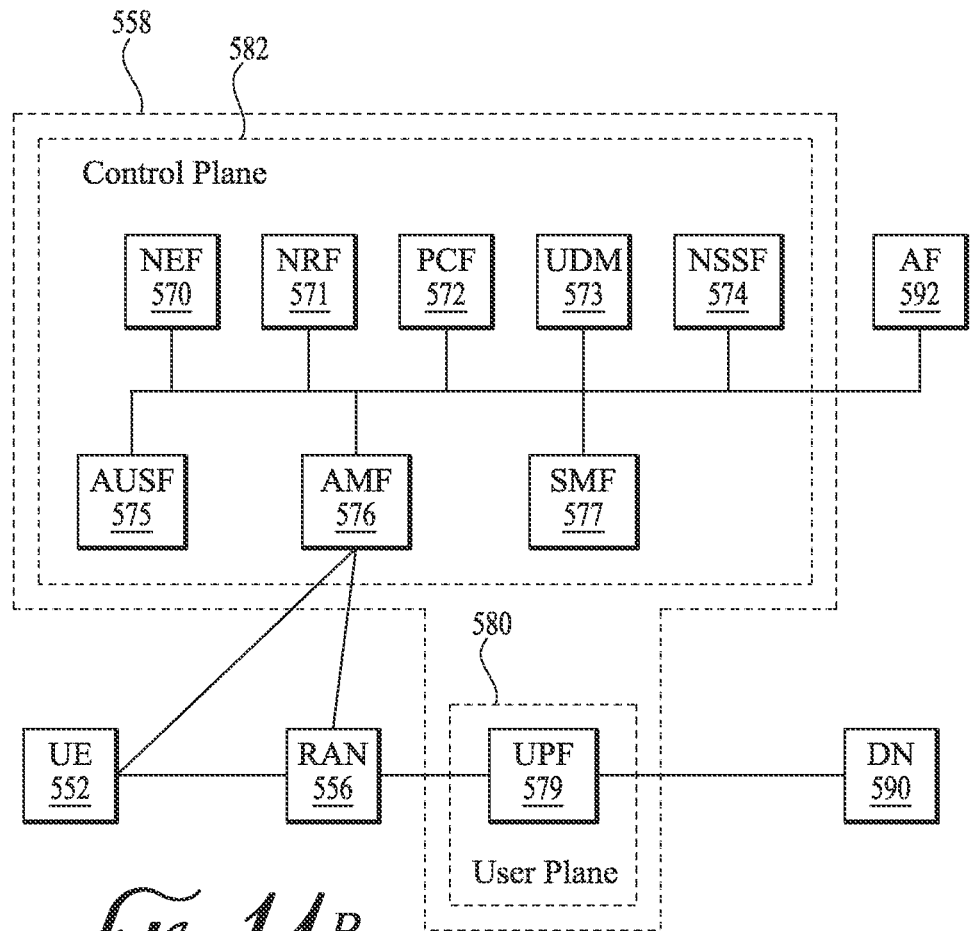
FIG. 14B is a block diagram of a 5G core network according to an embodiment of the disclosure.

Turning now to FIG. 14B, further details of the core network 558 are described. In an embodiment, the core network 558 is a 5G core network. 5G core network technology is based on a service based architecture paradigm.

Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access node 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 15:
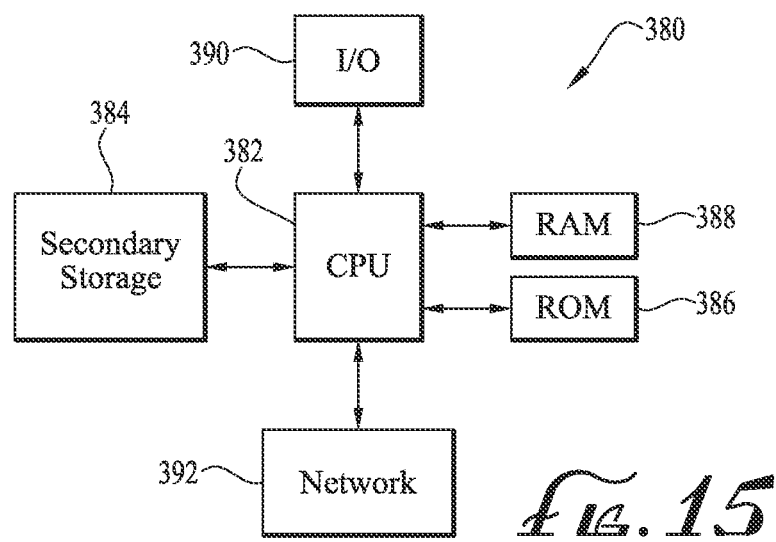
FIG. 15 is a block diagram of a computer system according to an embodiment of the disclosure.

FIG. 15 illustrates a computer system 380 suitable for implementing one or more embodiments disclosed herein, for example implementing one or more computers, servers or the like as disclosed or used herein, including without limitation any aspect of the computing system associated with control van 110 (e.g., computer 132); any aspect of the computing components and network associated with FIG. 4 (e.g., computer 222); any aspect of a unit level control system as shown in FIG. 2 (e.g., controller 142); etc. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The following are non-limiting, specific aspects in accordance with the present disclosure:

A first embodiment, which is a method of controlling a pumping sequence of a fracturing fleet at a wellsite, comprising retrieving, by a managing application executing on a computer at the wellsite, a pumping sequence from a storage computer; establishing electronic communication between a managing application and a plurality of fracturing units located at the wellsite; receiving, by the managing application, an indication of status from at least one sensor associated with each of the plurality of fracturing units; starting a stage script, by the managing application, with multiple sequential instructions for a pumping stage of the pumping sequence; controlling, by the managing application, the plurality of fracturing units in accordance with the stage script; and receiving, by the managing application, one or more periodic data sets from the at least one sensor associated with each of plurality of fracturing units, wherein the one or more data sets comprise periodic equipment data indicative of a current state of a pumping stage of a pumping sequence.

A second embodiment, which is the method of the first embodiment, further comprising determining, by the managing application, the current state of the pumping stage of the pumping sequence, comparing, by the managing application, the current state of the pumping stage to a pumping sequence target; and in response to the current state of the pumping stage failing to satisfy the pumping sequence target, modifying one or more instructions of the stage script by the managing application.

A third embodiment, which is the method of the second embodiment, wherein the current state of the pumping stage and the pumping sequence target each comprise a flow rate of fracturing fluid pumped into a wellbore at the wellsite for the pumping stage, a composition of the fracturing fluid for the pumping stage, a total amount of fracturing fluid pumped into the wellbore, a total amount of proppant placed into the wellbore, or any combination thereof.

A fourth embodiment, which is the method of any of the first to third embodiments, wherein the periodic equipment data comprises temperature, pressure, flow rate, density, viscosity, chemical, strain, accelerometers, exhaust, acoustic, fluid level, position, identity of a component of the fracturing fluid, amount or concentration of the component of the fracturing fluid, density, or any combination thereof.

A fifth embodiment, which is the method of any of the first to fourth embodiments, further comprising generating, by the managing application, a user notification in response to the current state of the pumping stage exceeding the pumping sequence threshold.

A sixth embodiment, which is the method of any of the first to fifth embodiments, further comprising upon an indication that the current state of the pumping stage is complete, retrieving by the managing application, another stage script with multiple sequential instructions for another pumping stage of the pumping sequence.

A seventh embodiment, which is the method of the sixth embodiment, further comprising determining, by the managing application, a transitional pumping sequence of the plurality of fracturing units using the another stage script and based upon an indication of current status from the at least one sensor associated with each of the plurality of fracturing units.

An eight embodiment, which is the method of the seventh embodiment, further comprising controlling, by the managing application, the plurality of fracturing units in accordance with the transitional pumping sequence and the another stage script.

A ninth embodiment, which is the method of any of the sixth to eighth embodiments, further comprising upon an indication that a current state of the another pumping stage is complete, determining, by the managing application, whether the fracturing job is complete.

A tenth embodiment, which is the method of any of the first to ninth embodiments, further comprising upon an indication that the fracturing job is complete, automatically placing, by the managing application, each of the fracturing units in a standby or off condition.

An eleventh embodiment, which is the method of any of the first to tenth embodiments wherein (i) the periodic equipment data is collected at a time interval of one of milliseconds, seconds, minutes, hours, days, weeks, or months; (ii) the user notification is an email, a text, or user interface notification; (iii) the storage computer is a data server, computer, or data storage device located at a wellsite or remote from the wellsite; (iv) the electronic communication is wired communication, wireless communication selected from one of a cellular node, satellite communication, or short range radio frequency, or a combination thereof; or (v) any combination of (i)-(iv).

A twelfth embodiment, which is a method of controlling a pumping sequence of a fracturing fleet at a wellsite, comprising monitoring a status of a plurality of fracturing units by a managing application executing on a computer, wherein the status of each fracturing unit is indicated by data from one or more equipment sensors associated with each fracturing unit; starting, by the managing application, an automated script with multiple sequential instructions for operating the plurality of fracturing units to conduct the pumping sequence; monitoring, by the managing application after each instruction, for an exception notification generated from the automated script, wherein the exception notification is associated with a failure to execute one or more instructions provided to the fracturing units (e.g., associated with a failure condition associated with one or more of the fracturing units); and in response to receiving the exception notification from the automated script, starting, by the managing application, an automated exception sub-script to correct the failure to execute one or more instructions provided to the fracturing units (e.g., the failure condition) associated with the exception notification.

A thirteenth embodiment, which is the method of the twelfth embodiment, further comprising creating a readable log of a resultant condition of the automated exception sub-script upon execution thereof by the managing application.

A fourteenth embodiment, which is the method of the twelfth or thirteenth embodiment, further comprising generating a user notification by the managing application in response to a failure condition of the automated exception sub-script.

A fifteenth embodiment, which is the method of any of the twelfth to fourteenth embodiments, further comprising ending the automated script controlling a fracturing unit by the managing application in response to a failure condition of the automated exception sub-script.

A sixteenth embodiment, which is the method of any of the twelfth to fifteenth embodiments, further comprising (a) writing, by the managing application, to the readable log the status of one or more of the frac units after each instruction; (b) generating, by the managing application, a user notification regarding the status of one or more of the frac units after each instruction; (c) generating, by the managing application, a user notification regarding the resultant condition of the automated exception; or (d) any combination of (a)-(c).

A seventeenth embodiment, which is a method of any of the twelfth to sixteenth embodiments, wherein (i) each fracturing unit is selected from fracturing pump, manifold, blending unit, hydration blender, proppant storage unit, chemical unit, or water supply unit; (ii) the equipment sensors produce periodic equipment data comprising temperature, pressure, flow rate, density, viscosity, vibration, strain, accelerometers, exhaust, acoustic, position, identity of a component of the fracturing fluid, amount or concentration of the component of the fracturing fluid, density, or any combination thereof; (iii) the periodic equipment data of (ii) is collected at a time interval of one of milliseconds, seconds, minutes, hours, days, weeks, or months; (iv) the user notification is an email, a text message, or screen notification.

An eighteenth embodiment, which is a method of controlling a pumping sequence of a fracturing fleet at a wellsite, comprising, establishing electronic communication between a managing application executing on a computer located at the wellsite and a plurality of fracturing units located at the wellsite; receiving automatically, by the managing application via the electronic communication, a unique identifier for each of the plurality of fracturing units; preparing, by the managing application, an inventory of fracturing units at the wellsite; comparing, by the managing application, the inventory of fracturing units to the pumping sequence; and identifying, by the managing application, a plurality of designated fracturing units from the inventory of fracturing units to perform the pumping sequence.

A nineteenth embodiment, which is the method of the eighteenth embodiment, wherein the plurality of designated fracturing units is optimized based on one or more of cost of each fracturing stage, total cost of the fracturing job, a noise emission limit, a greenhouse gas emissions target, a fuel consumption target, a proppant volume target for each fracturing stage, a proppant volume target for the fracturing job, a usage limit of one or more chemicals present in the fracturing fluid used in each fracturing stage, a usage limit of one or more chemicals present in the fracturing fluid used in the fracturing job, or any combination thereof.

A twentieth embodiment, which is the method of nineteenth embodiment, further comprising retrieving, by a managing application executing on a computer at the wellsite, a pumping sequence from a storage computer; establishing electronic communication between a managing application and a plurality of fracturing units located at the wellsite; receiving, by the managing application, an indication of status from at least one sensor associated with each of the plurality of fracturing units; starting a stage script, by the managing application, with multiple sequential instructions for a pumping stage of the pumping sequence; controlling, by the managing application, the plurality of fracturing units in accordance with the stage script; and receiving, by the managing application, one or more periodic data sets from the at least one sensor associated with each of plurality of fracturing units, wherein the one or more data sets comprise periodic equipment data indicative of a current state of a pumping stage of a pumping sequence.

A twenty-first embodiment, which is the method of twentieth embodiment, further comprising monitoring a status of a plurality of fracturing units by a managing application executing on a computer, wherein the status of each fracturing unit is indicated by data from one or more equipment sensors associated with each fracturing unit; starting, by the managing application, an automated script with multiple sequential instructions for operating the plurality of fracturing units to conduct the pumping sequence; monitoring, by the managing application after each instruction, for an exception notification generated from the automated script, wherein the exception notification is associated with a failure to execute one or more instructions provided to the fracturing units (e.g., associated with a failure condition associated with one or more of the fracturing units); and in response to receiving the exception notification from the automated script, starting, by the managing application, an automated exception sub-script to correct the failure to execute one or more instructions provided to the fracturing units (e.g., the failure condition) associated with the exception notification.

A twenty-second embodiment, which is a method of controlling a pumping sequence of a fracturing fleet connected to multiple wellbores, comprising retrieving, by a managing application executing on a computer at a wellsite proximate the wellbores, a pumping sequence from a storage computer; establishing electronic communication between a managing application and a plurality of fracturing units coupled with a first wellbore and a second wellbore; receiving, by the managing application, an indication of status from at least one sensor associated with each of the plurality of fracturing units; starting a stage script, by the managing application, with multiple sequential instructions for a pumping stage of the pumping sequence, wherein the pumping stage pumps fluid into the first wellbore, wherein the pumping stage pumps fluid into the second wellbore subsequent to (e.g., after) or simultaneous with (e.g., concurrent) pumping fluid into the first wellbore; controlling, by the managing application, the plurality of fracturing units in accordance with the stage script; and receiving, by the managing application, one or more periodic data sets from the at least one sensor associated with each of plurality of fracturing units, wherein the one or more data sets comprise periodic equipment data indicative of a current state of a pumping stage of a pumping sequence.

A twenty-third embodiment, which is a method of controlling a pumping sequence of a fracturing fleet connected to multiple wellbores, comprising retrieving, by a managing application executing on a computer at a wellsite proximate the wellbores, a pumping sequence from a storage computer; establishing electronic communication between a managing application and a plurality of fracturing units coupled with a first wellbore and a second wellbore; receiving, by the managing application, an indication of status from at least one sensor associated with each of the plurality of fracturing units; starting a stage script, by the managing application, with multiple sequential instructions for a pumping stage of the pumping sequence, wherein the pumping stage treats the first wellbore and the second wellbore simultaneously; controlling, by the managing application, the plurality of fracturing units in accordance with the stage script; and receiving, by the managing application, one or more periodic data sets from the at least one sensor associated with each of plurality of fracturing units, wherein the one or more data sets comprise periodic equipment data indicative of a current state of a pumping stage of a pumping sequence.

A twenty-fourth embodiment, which is a method of controlling a pumping sequence of a fracturing fleet at a wellsite, comprising monitoring a status of a plurality of fracturing units by a managing application executing on a computer, wherein the status of each fracturing unit is indicated by data from one or more equipment sensors associated with each fracturing unit, wherein an equipment exception notification is generated in response to a failure of one or more equipment sensors; starting, by the managing application, a pumping stage with one or more subprocesses, wherein the subprocess is a closed loop sequence with multiple sequential instructions for operating the plurality of fracturing units to conduct the pumping sequence; starting, by the managing application, the one or more subprocess within the pumping stage; monitoring, by the managing application after each instruction, for an exception notification generated from the subprocess, wherein the exception notification is one of the equipment exception, loss exception, target exception, modeling exception, user exception, schedule exception, is associated with a failure to execute one or more instructions provided to the fracturing units (e.g., associated with a failure condition associated with one or more of the fracturing units); and in response to receiving the exception notification from the subprocess, starting, by the managing application, an automated exception sub-script to correct the failure to execute one or more instructions provided to the fracturing units (e.g., the failure condition) associated with the exception notification.

A twenty-fifth embodiment, which is the method of the twenty-fourth embodiment, wherein the subprocess is one of i) a pressure test of one or more frac pumps; (ii) a removal of atmospheric air from the frac units and fluid lines; (iii) a pressure test of all pumps, blenders, and manifold (e.g., missile); (iv) to dynamically adjust pump rate and rate of change between pump rates based on sensor data from downhole sensors (e.g., fiber optic cable proximate the perforations); (v) to increase the amount of proppant added to the frac fluid to increase the proppant density can be controlled by the managing application receiving wellbore environment data from wellbore sensors, wherein wellbore sensors include at least one of a production tree sensor or a downhole pressure sensor, wherein the production tree can be one of a drilling tree, a blow-out preventer, or a sub-sea tree; (vi) for pumping frac fluids, chemicals, and other frac liquids per treatment schedule, wherein the treatment schedule includes a pumping rate and a fluid composition, wherein the pump rate includes a constant pumping rate, an increasing pumping rate, a decreasing pumping rate, or an idle rate, wherein the fluid composition includes water with an amount of proppant, an amount of gelling agent, an amount of friction reducer (for example, the managing application 136 monitors the data from the equipment data modules to establish a total fluid flow or combined pumping rate as well as compositional characteristics of the fluid being pumped); (vii) for dropping a diverter and managing treatment of the zone for addition of the diverter with the managing application receiving wellbore environment data from wellbore sensors (for example, the managing application 136 initiates the addition of a diverter treatment with additional treatment fluids, monitors sensor data from the treatment well, monitors the data from the equipment data modules to establish a total fluid flow or combined pumping rate for the change in pumping behavior based on the characteristics of the diverter treatment and fluid being pumped); (viii) for dropping two or more diverter treatments for a zone with a managed pressure limit with the managing application receiving wellbore environment data from wellbore sensors (for example, the managing application 136 initiates the addition of a diverter treatment, monitors the sensor data from the treatment well, monitors data from the equipment data modules to establish a treatment flow rate with an upper and lower treatment pressure limit); (ix) for decreasing the proppant density and the volume of treatment fluids with the managing application receiving wellbore environment data from wellbore sensors (for example, the amount of proppant added to the frac fluid to decrease the proppant density can be controlled by the combined sensor data from the treatment well, such as a sensor attached to the production tree or a downhole pressure sensor, and the equipment data modules); or any combination of (i) to (ix).

A twenty-sixth embodiment, which is a method of the twenty-fourth or twenty-fifth embodiment, wherein the equipment exception is in response to a risk of equipment failure exceeding a threshold risk value.

A twenty-seventh embodiment, which is a method of any of the twenty-fourth to twenty-sixth embodiments, wherein the loss exception is in response to an equipment failure wherein the equipment failure includes loss of a sensor unit, loss of a control unit, loss of communication, loss of power, and equipment failure.

A twenty-eighth embodiment, which is a method of any of the twenty-fourth to twenty-seventh embodiments, wherein the target exception is in response to not achieving a wellbore treatment goal or the risk of not achieving a wellbore treatment goal exceeding the threshold risk value.

A twenty-ninth embodiment, which is a method of any of the twenty-fourth to twenty-eighth embodiments, wherein the modeling exception is in response to a modeling application modifying one of the targets or utilization of the frac units.

A thirtieth embodiment, which is a method of any of the twenty-fourth to twenty-ninth embodiments, wherein the user exception is in response to a user modifying one of the targets, the stage, or the sub-process.

A thirtieth-first embodiment, which is a method of any of the twenty-fourth to thirtieth embodiments, wherein the schedule exception is in response to modification of the treatment schedule in response to receiving any combination of the equipment exception, the loss exception, the target exception, the modeling exception, or the user exception.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of controlling a pumping sequence of a fracturing fleet at a wellsite, comprising:
   loading, by a managing application executing on a computer at the wellsite, a pumping sequence;
   establishing electronic communication between the managing application and a plurality of fracturing units located at the wellsite;
   retrieving, by the managing application, one or more periodic datasets from at least one sensor associated with each of the plurality of fracturing units, and wherein the one or more periodic datasets are indicative of a current operation of each of the plurality of fracturing units;
   starting a stage script, by the managing application, with multiple sequential instructions for a pumping stage of a pumping sequence;
   controlling, by the managing application, the plurality of fracturing units in accordance with the stage script;
   receiving, by the managing application, at least one operational exception from one or more of the plurality of fracturing units; and
   in response to receiving the operational exception, isolating, by the managing application, one or more fracturing units by an instrumented package via an automated exception sub-script.

2. The method of claim 1, wherein:
the at least one operational exception is a status of equipment performance.

3. The method of claim 2, wherein:
the status of equipment performance comprises i) a decrease in equipment performance, ii) an indication of equipment failure, iii) a risk of equipment failure, iv) a loss of equipment, or v) combinations thereof.

4. The method of claim 1, wherein:
a target set point is i) reduced or ii) ended in response to the operational exception.

5. The method of claim 1, wherein:
the instrumented package comprises an isolation valve and a sensor.

6. The method of claim 5, wherein:
the sensor is i) a pressure sensor, ii) a flowrate sensor, or iii) combinations thereof.

7. The method of claim 1, wherein:
an isolation valve within the instrument package is configured to isolate the one or more fracturing units.

8. The method of claim 1, wherein:
the instrumented package is located i) within a wellhead isolation unit, ii) between a manifold and the wellhead isolation unit, iii) on an inlet line to each of the plurality of frac pumps, iv) on a discharge line to each of the plurality of frac pump, v) between a mixing blender and the manifold, vi) between a proppant storage unit and the mixing blender, vii) between a hydration blender and the mixing blender, viii) between a chemical unit and the hydration blender, ix) between a water supply and the hydration blender.

9. The method of claim 1, wherein:
(i) each fracturing unit is selected from fracturing pump, manifold, blending unit, hydration blender, proppant storage unit, chemical unit, water supply unit, or wellhead isolation unit;
(ii) the periodic dataset comprises temperature, pressure, flow rate, density, viscosity, chemical, strain, accelerometers, exhaust, acoustic, fluid level, position, identity of a component of fracturing fluid, amount or concentration of the component of the fracturing fluid, density, or any combination thereof;
(iii) the periodic dataset is collected at a time interval of one of milliseconds, seconds, minutes, hours, days, weeks, or months;
(iv) the electronic communication is wired communication, wireless communication selected from one of a cellular node, satellite communication, or short range radio frequency, or a combination thereof; or
(v) any combination of (i)-(iv).

10. A method of controlling a pumping sequence of a fracturing fleet at a wellsite, comprising:
   loading, by a managing application executing on a computer at the wellsite, a pumping sequence;

establishing electronic communication between the managing application and a plurality of fracturing units located at the wellsite;

retrieving, by the managing application, one or more periodic datasets from at least one sensor associated with each of the plurality of fracturing units, and wherein the one or more periodic datasets are indicative of a current operation of each of the plurality of fracturing units;

starting a stage script, by the managing application, with multiple sequential instructions for a pumping stage of a pumping sequence;

controlling, by the managing application, the plurality of fracturing units in accordance with the stage script;

receiving, by the managing application, at least one operational exception from a fracturing pump; and in response to receiving the operational exception, isolating, by the managing application, the fracturing pump by i) reducing a pumping load to zero and ii) closing an isolation valve on an instrumented package via an automated exception sub-script.

11. The method of claim 10, wherein:
the at least one operational exception is a status of equipment performance.

12. The method of claim 11, wherein:
the status of equipment performance comprises i) a decrease in equipment performance, ii) an indication of equipment failure, iii) a risk of equipment failure, iv) a loss of equipment, or v) combinations thereof.

13. The method of claim 10, wherein:
the instrumented package is located on i) a feed line, ii) a discharge line, or iii) both fluidically coupled to a manifold.

14. The method of claim 10, wherein:
wherein the pumping load is a flowrate of fracturing fluid.

15. A method of controlling a pumping sequence of a fracturing fleet at a wellsite, comprising:

loading, by a managing application executing on a computer at the wellsite, a pumping sequence;

establishing electronic communication between the managing application and a plurality of fracturing units located at the wellsite;

retrieving, by the managing application, one or more periodic datasets from at least one wellbore sensor or wellhead sensor, and wherein the one or more periodic datasets are indicative of a wellbore environment;

starting a stage script, by the managing application, with multiple sequential instructions for a pumping stage of a pumping sequence;

controlling, by the managing application, the plurality of fracturing units in accordance with the stage script;

receiving, by the managing application, at least one operational exception from a fracturing unit, a wellbore sensor, or a wellhead sensor; and in response to receiving the operational exception, starting, by the managing application, a second set of fracturing units by i) beginning a pumping load from zero and ii) opening an isolation valve on an instrumented package via an automated exception sub-script.

16. The method of claim 15, wherein:
the at least one operational exception is a status of a set-point of the pumping stage, a change in volume of proppant entering a formation, a change in proppant rate, or combinations thereof.

17. The method of claim 15, further comprising:
modifying the pumping sequence, a set-point of the pumping stage, or combinations thereof in response to the at least one operational exception.

18. The method of claim 15, wherein:
the instrumented package is located on i) a feed line, ii) a discharge line, or iii) both fluidically coupled to a manifold.

19. The method of claim 15, further comprising:
balancing, by the managing application, a pumping load between a first set of fracturing units and the second set of fracturing units via an automated exception sub-script, wherein the first set of fracturing units comprise the original plurality of fracturing units operating at the beginning of the pumping stage.

20. The method of claim 15, further comprising:
retrieving, by the managing application, one or more periodic datasets from at least one sensor associated with each of the plurality of fracturing units, and wherein the one or more periodic datasets are indicative of a current operation of each of the plurality of fracturing units.

* * * * *